(12) United States Patent
Yuen

(10) Patent No.: US 9,311,405 B2
(45) Date of Patent: Apr. 12, 2016

(54) SEARCH ENGINE FOR VIDEO AND GRAPHICS

(75) Inventor: Henry C. Yuen, Pasadena, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/612,288

(22) Filed: Sep. 12, 2012

(65) Prior Publication Data

US 2013/0097145 A1    Apr. 18, 2013

Related U.S. Application Data

(63) Continuation of application No. 12/819,359, filed on Jun. 21, 2010, now Pat. No. 8,341,137, which is a continuation of application No. 11/894,684, filed on Aug. 20, 2007, now Pat. No. 7,822,760, which is a (Continued)

(51) Int. Cl.
*G06F 17/30*       (2006.01)
*H04N 21/81*      (2011.01)

(52) U.S. Cl.
CPC .... *G06F 17/30864* (2013.01); *G06F 17/30265* (2013.01); *G06F 17/30896* (2013.01);

(Continued)

(58) Field of Classification Search
CPC ............... G06F 17/30864; G06F 17/30017; G06F 17/30781; G06F 17/3079; G06F 17/30825; G06F 17/30846; G06F 17/30265; G06F 17/30896; G06F 3/0484; G06F 17/30867; G06F 3/0481; G06F 3/04847; G06F 17/3053; G06F 3/04842; G06F 17/2247; G06F 17/2264; G06F 17/30; G06F 3/041; G06F 3/04815; G06F 3/0482; G06F 15/02; G06F 17/2223; G06F 17/2235; H04N 21/462; H04N 21/482; H04N 21/472; H04N 21/86; Y10S 707/99945; Y10S 707/99931; Y10S 707/99933

USPC ........ 707/706, 711, 769, 741, 736, 822, 770, 707/802, E17.044, E17.01, E17.04, 758, 707/715, 735, 719, 780, 781, 804, 805, 707/E17.002, E17.014, E17.026, E17.108; 715/719, 760; 709/219, 218, 217, 206, 709/203; 386/241

See application file for complete search history.

(56) References Cited

U.S. PATENT DOCUMENTS 4,028,733 A * 6/1977 Ulicki ........................... 386/201
4,287,539 A * 9/1981 Bixby et al. .................... 360/18

(Continued)

FOREIGN PATENT DOCUMENTS

CA      2635571 A1    7/2007
CN      247386        4/2001

(Continued)

OTHER PUBLICATIONS

John R. Smith and Shih-Fu Chang—"Visually Searching the Web for Content"—Columbia University; IEEE; Jul.-Sep. 1997—(pp. 12-20 or 1-9).*

(Continued)

*Primary Examiner* — Anh Ly
(74) *Attorney, Agent, or Firm* — Ropes & Gray LLP

(57) ABSTRACT

A method of selecting graphic or video files having corresponding locators used to locate such graphic or video files using a computer. Identifiers are created by searching an area within a web page near a graphic or video file for searchable identification terms and searching an area within a web page near links to a graphic or video for searchable identification terms. The identifiers are stored in a database. User requests for graphic or video file content are received and the database of identifiers is searched to find graphic and video files corresponding criteria of the user. Graphic or video file content is then provided to the user.

14 Claims, 4 Drawing Sheets

Related U.S. Application Data continuation of application No. 11/021,478, filed on Dec. 22, 2004, now abandoned, which is a continuation of application No. 09/452,287, filed on Nov. 30, 1999, now Pat. No. 6,859,799.

(60) Provisional application No. 60/110,299, filed on Nov. 30, 1998.

(52) U.S. Cl.
CPC ....... *H04N21/816* (2013.01); *Y10S 707/99931* (2013.01); *Y10S 707/99933* (2013.01); *Y10S 707/99945* (2013.01)

(56) References Cited

U.S. PATENT DOCUMENTS

| | | | |
|---|---|---|---|
| 4,355,415 A | 10/1982 | George et al. | |
| 4,488,179 A | 12/1984 | Kru/ger et al. | |
| 4,602,279 A | 7/1986 | Freeman | |
| 4,605,964 A | 8/1986 | Chard | |
| 4,694,490 A | 9/1987 | Harvey et al. | |
| 4,704,725 A | 11/1987 | Harvey et al. | |
| 4,706,121 A | 11/1987 | Young | |
| 4,718,107 A | 1/1988 | Hayes | |
| 4,745,549 A | 5/1988 | Hashimoto | |
| 4,751,578 A | 6/1988 | Reiter et al. | |
| 4,787,063 A | 11/1988 | Muguet | |
| 4,847,698 A | 7/1989 | Freeman | |
| 4,857,999 A | 8/1989 | Welsh | |
| 4,908,707 A | 3/1990 | Kinghorn | |
| 4,930,158 A | 5/1990 | Vogel | |
| 4,959,720 A | 9/1990 | Duffield et al. | |
| 4,963,994 A | 10/1990 | Levine | |
| 4,965,825 A | 10/1990 | Harvey et al. | |
| 4,977,455 A | 12/1990 | Young | |
| 4,985,887 A | 1/1991 | Mizuhara et al. | |
| 5,027,400 A | 6/1991 | Baji et al. | |
| 5,047,867 A | 9/1991 | Strubbe et al. | |
| 5,109,279 A | 4/1992 | Ando | |
| 5,109,414 A | 4/1992 | Harvey et al. | |
| 5,134,719 A | 7/1992 | Mankovitz | |
| 5,151,789 A | 9/1992 | Young | |
| 5,155,591 A | 10/1992 | Wachob | |
| 5,172,413 A | 12/1992 | Bradley et al. | |
| 5,200,822 A | 4/1993 | Bronfin et al. | |
| 5,206,859 A * | 4/1993 | Anzai ................ | H04M 11/068 707/E17.028 |
| 5,223,924 A | 6/1993 | Strubbe | |
| 5,231,493 A | 7/1993 | Apitz | |
| 5,233,654 A | 8/1993 | Harvey et al. | |
| 5,247,575 A | 9/1993 | Sprague et al. | |
| 5,249,043 A | 9/1993 | Grandmougin | |
| 5,253,066 A | 10/1993 | Vogel | |
| 5,299,006 A | 3/1994 | Kim et al. | |
| 5,329,379 A | 7/1994 | Rodriguez et al. | |
| 5,335,277 A | 8/1994 | Harvey et al. | |
| 5,339,434 A | 8/1994 | Rusis | |
| 5,341,350 A | 8/1994 | Frank et al. | |
| 5,346,326 A * | 9/1994 | Bienvenu ................... | 402/79 |
| 5,353,121 A | 10/1994 | Young et al. | |
| 5,355,162 A | 10/1994 | Yazolino et al. | |
| 5,357,276 A | 10/1994 | Banker et al. | |
| 5,404,567 A | 4/1995 | DePietro et al. | |
| 5,410,343 A | 4/1995 | Coddington et al. | |
| 5,410,344 A | 4/1995 | Graves et al. | |
| 5,412,720 A | 5/1995 | Hoarty | |
| 5,426,699 A | 6/1995 | Wunderlich et al. | |
| 5,442,389 A | 8/1995 | Blahut et al. | |
| 5,442,390 A | 8/1995 | Hooper et al. | |
| 5,453,779 A | 9/1995 | Dan et al. | |
| 5,461,415 A | 10/1995 | Wolf et al. | |
| 5,465,385 A | 11/1995 | Ohga et al. | |
| 5,474,000 A | 12/1995 | Mizuno et al. | |
| 5,475,835 A | 12/1995 | Hickey | |
| 5,477,263 A | 12/1995 | O'Callaghan et al. | |
| 5,479,266 A | 12/1995 | Young et al. | |
| 5,479,268 A | 12/1995 | Young et al. | |
| 5,479,302 A | 12/1995 | Haines | |
| 5,481,312 A * | 1/1996 | Cash et al. ................... | 348/465 |
| 5,485,197 A | 1/1996 | Hoarty | |
| 5,491,820 A | 2/1996 | Belove et al. | |
| 5,502,504 A | 3/1996 | Marshall et al. | |
| 5,506,932 A | 4/1996 | Holmes et al. | |
| 5,517,254 A | 5/1996 | Monta et al. | |
| 5,517,257 A | 5/1996 | Dunn et al. | |
| 5,517,605 A | 5/1996 | Wolf | |
| 5,521,631 A | 5/1996 | Budow et al. | |
| 5,523,794 A | 6/1996 | Mankovitz et al. | |
| 5,524,195 A | 6/1996 | Clanton, III et al. | |
| 5,524,271 A | 6/1996 | Hollmann et al. | |
| 5,528,513 A | 6/1996 | Vaitzblit et al. | |
| 5,532,773 A * | 7/1996 | Shaw et al. ................... | 353/26 A |
| 5,537,141 A | 7/1996 | Harper et al. | |
| 5,539,449 A | 7/1996 | Blahut et al. | |
| 5,539,880 A | 7/1996 | Lakhani | |
| 5,541,638 A | 7/1996 | Story | |
| 5,541,738 A | 7/1996 | Mankovitz | |
| 5,548,338 A | 8/1996 | Ellis et al. | |
| 5,550,576 A | 8/1996 | Klosterman | |
| 5,550,825 A | 8/1996 | McMullan, Jr. et al. | |
| 5,557,338 A | 9/1996 | Maze et al. | |
| 5,557,724 A | 9/1996 | Sampat et al. | |
| 5,559,548 A | 9/1996 | Davis et al. | |
| 5,559,549 A | 9/1996 | Hendricks et al. | |
| 5,565,922 A | 10/1996 | Krause | |
| 5,574,778 A | 11/1996 | Ely et al. | |
| 5,576,755 A | 11/1996 | Davis et al. | |
| 5,583,561 A | 12/1996 | Baker et al. | |
| 5,583,563 A | 12/1996 | Wanderscheid et al. | |
| 5,583,566 A | 12/1996 | Kanno et al. | |
| 5,585,838 A | 12/1996 | Lawler et al. | |
| 5,585,858 A | 12/1996 | Harper et al. | |
| 5,585,866 A | 12/1996 | Miller et al. | |
| 5,586,264 A | 12/1996 | Belknap et al. | |
| 5,589,874 A * | 12/1996 | Buchin ................... | 348/72 |
| 5,589,892 A | 12/1996 | Knee et al. | |
| 5,592,551 A | 1/1997 | Lett et al. | |
| 5,594,509 A | 1/1997 | Florin et al. | |
| 5,594,779 A | 1/1997 | Goodman | |
| 5,602,582 A | 2/1997 | Wanderscheid et al. | |
| 5,606,642 A | 2/1997 | Stautner et al. | |
| 5,610,653 A | 3/1997 | Abecassis | |
| 5,614,940 A * | 3/1997 | Cobbley et al. ................ | 725/138 |
| 5,616,876 A | 4/1997 | Cluts | |
| 5,619,247 A | 4/1997 | Russo | |
| 5,619,249 A * | 4/1997 | Billock et al. ..................... | 725/5 |
| 5,619,274 A | 4/1997 | Roop et al. | |
| 5,623,613 A | 4/1997 | Rowe et al. | |
| 5,625,678 A | 4/1997 | Blomfield-Brown | |
| 5,629,867 A | 5/1997 | Goldman | |
| 5,630,060 A | 5/1997 | Tang et al. | |
| 5,630,119 A | 5/1997 | Aristides et al. | |
| 5,632,007 A | 5/1997 | Freeman | |
| 5,635,987 A | 6/1997 | Park et al. | |
| 5,648,824 A | 7/1997 | Dunn et al. | |
| 5,652,613 A | 7/1997 | Lazarus et al. | |
| 5,654,748 A | 8/1997 | Matthews, III | |
| 5,654,886 A | 8/1997 | Zereski, Jr. et al. | |
| 5,657,072 A | 8/1997 | Aristides et al. | |
| 5,659,742 A | 8/1997 | Beattie et al. | |
| 5,666,645 A | 9/1997 | Thomas et al. | |
| 5,671,277 A | 9/1997 | Ikenoue et al. | |
| 5,671,377 A | 9/1997 | Bleidt et al. | |
| 5,675,743 A | 10/1997 | Mavity | |
| 5,678,041 A | 10/1997 | Baker et al. | |
| 5,682,195 A | 10/1997 | Hendricks et al. | |
| 5,684,525 A | 11/1997 | Klosterman | |
| 5,694,163 A | 12/1997 | Harrison | |
| 5,696,765 A | 12/1997 | Safadi | |
| 5,696,869 A * | 12/1997 | Abecassis ..................... | 386/290 |
| 5,708,845 A | 1/1998 | Wistendahl et al. | |
| 5,708,961 A | 1/1998 | Hylton et al. | |
| 5,710,601 A | 1/1998 | Marshall et al. | |
| 5,717,452 A | 2/1998 | Janin et al. | |

(56) References Cited

U.S. PATENT DOCUMENTS

| | | | |
|---|---|---|---|
| 5,721,815 A | 2/1998 | Ottesen et al. | |
| 5,721,829 A | 2/1998 | Dunn et al. | |
| 5,727,060 A | 3/1998 | Young | |
| 5,729,741 A * | 3/1998 | Liaguno et al. | 704/270 |
| 5,732,216 A | 3/1998 | Logan et al. | |
| 5,734,119 A | 3/1998 | France et al. | |
| 5,734,431 A | 3/1998 | Dachiku et al. | |
| 5,734,886 A | 3/1998 | Grosse et al. | |
| 5,740,428 A * | 4/1998 | Mortimore | G06F 19/321 707/E17.028 |
| 5,742,443 A | 4/1998 | Tsao et al. | |
| 5,742,816 A | 4/1998 | Barr et al. | |
| 5,745,710 A | 4/1998 | Clanton, III et al. | |
| 5,751,282 A | 5/1998 | Girard et al. | |
| 5,751,286 A | 5/1998 | Barber et al. | |
| 5,751,672 A | 5/1998 | Yankowski | |
| 5,752,159 A | 5/1998 | Faust et al. | |
| 5,752,160 A | 5/1998 | Dunn | |
| 5,752,246 A | 5/1998 | Rogers et al. | |
| 5,754,771 A | 5/1998 | Epperson et al. | |
| 5,758,257 A | 5/1998 | Herz et al. | |
| 5,758,258 A | 5/1998 | Shoff et al. | |
| 5,758,259 A | 5/1998 | Lawler | |
| 5,760,821 A | 6/1998 | Ellis et al. | |
| 5,761,417 A | 6/1998 | Henley et al. | |
| 5,761,607 A | 6/1998 | Gudesen et al. | |
| 5,768,528 A | 6/1998 | Stumm | |
| 5,771,354 A | 6/1998 | Crawford | |
| 5,774,170 A | 6/1998 | Hite et al. | |
| 5,778,181 A | 7/1998 | Hidary et al. | |
| 5,778,182 A | 7/1998 | Cathey et al. | |
| 5,778,187 A | 7/1998 | Monteiro et al. | |
| 5,778,367 A | 7/1998 | Wesinger, Jr. et al. | |
| 5,781,226 A | 7/1998 | Sheehan | |
| 5,781,227 A | 7/1998 | Goode et al. | |
| 5,781,228 A | 7/1998 | Sposato | |
| 5,790,176 A | 8/1998 | Craig | |
| 5,790,198 A | 8/1998 | Roop et al. | |
| 5,790,423 A | 8/1998 | Lau et al. | |
| 5,793,366 A | 8/1998 | Mano et al. | |
| 5,793,412 A | 8/1998 | Asamizuya | |
| 5,793,971 A | 8/1998 | Fujita et al. | |
| 5,794,217 A | 8/1998 | Allen | |
| 5,796,829 A | 8/1998 | Newby et al. | |
| 5,796,952 A | 8/1998 | Davis et al. | |
| 5,798,921 A | 8/1998 | Johnson et al. | |
| 5,802,284 A | 9/1998 | Karlton et al. | |
| 5,805,154 A | 9/1998 | Brown | |
| 5,805,763 A | 9/1998 | Lawler et al. | |
| 5,805,804 A | 9/1998 | Laursen et al. | |
| 5,805,806 A | 9/1998 | McArthur | |
| 5,808,608 A | 9/1998 | Young et al. | |
| 5,808,694 A | 9/1998 | Usui et al. | |
| 5,809,246 A | 9/1998 | Goldman | |
| 5,812,123 A | 9/1998 | Rowe et al. | |
| 5,812,134 A | 9/1998 | Pooser et al. | |
| 5,812,205 A | 9/1998 | Milnes et al. | |
| 5,813,009 A | 9/1998 | Johnson et al. | |
| 5,815,146 A | 9/1998 | Youden et al. | |
| 5,815,297 A | 9/1998 | Ciciora | |
| 5,818,438 A | 10/1998 | Howe et al. | |
| 5,818,439 A | 10/1998 | Nagasaka et al. | |
| 5,819,019 A | 10/1998 | Nelson | |
| 5,819,160 A | 10/1998 | Foladare et al. | |
| 5,822,530 A | 10/1998 | Brown | |
| RE35,954 E | 11/1998 | Levine | |
| 5,832,287 A | 11/1998 | Atalla | |
| 5,835,126 A | 11/1998 | Lewis | |
| 5,841,979 A | 11/1998 | Schulhof et al. | |
| 5,844,620 A | 12/1998 | Coleman et al. | |
| 5,850,218 A | 12/1998 | LaJoie et al. | |
| 5,861,906 A * | 1/1999 | Dunn et al. | 725/87 |
| 5,872,588 A | 2/1999 | Aras et al. | |
| 5,881,245 A | 3/1999 | Thompson | |
| 5,883,621 A | 3/1999 | Iwamura | |
| 5,884,028 A | 3/1999 | Kindell et al. | |
| 5,884,056 A * | 3/1999 | Steele | 715/738 |
| 5,884,141 A | 3/1999 | Inoue et al. | |
| 5,886,707 A | 3/1999 | Berg | |
| 5,886,732 A | 3/1999 | Humpleman | |
| 5,886,742 A | 3/1999 | Hibi et al. | |
| 5,887,243 A | 3/1999 | Harvey et al. | |
| 5,892,915 A | 4/1999 | Duso et al. | |
| 5,894,589 A | 4/1999 | Reber et al. | |
| 5,896,414 A | 4/1999 | Meyer et al. | |
| 5,898,441 A | 4/1999 | Flurry | |
| 5,898,456 A | 4/1999 | Wahl | |
| 5,899,582 A | 5/1999 | DuLac | |
| 5,900,904 A | 5/1999 | Okada et al. | |
| 5,903,234 A | 5/1999 | Kimura | |
| 5,903,263 A | 5/1999 | Emura | |
| 5,903,264 A | 5/1999 | Moeller et al. | |
| 5,903,892 A | 5/1999 | Hoffert et al. | |
| 5,905,522 A | 5/1999 | Lawler | |
| 5,905,847 A | 5/1999 | Kobayashi et al. | |
| 5,909,638 A | 6/1999 | Allen | |
| 5,911,046 A | 6/1999 | Amano | |
| 5,911,139 A | 6/1999 | Jain et al. | |
| 5,913,039 A | 6/1999 | Nakamura et al. | |
| 5,914,941 A | 6/1999 | Janky | |
| 5,915,090 A | 6/1999 | Joseph et al. | |
| 5,915,094 A | 6/1999 | Kouloheris et al. | |
| 5,916,303 A | 6/1999 | Scott | |
| 5,917,538 A | 6/1999 | Asamizuya | |
| 5,917,835 A | 6/1999 | Barrett et al. | |
| 5,920,702 A | 7/1999 | Bleidt et al. | |
| 5,920,800 A | 7/1999 | Schafer | |
| 5,922,045 A | 7/1999 | Hanson | |
| 5,922,048 A | 7/1999 | Emura | |
| 5,923,361 A | 7/1999 | Sutton, Jr. | |
| 5,926,204 A | 7/1999 | Mayer | |
| 5,926,205 A | 7/1999 | Krause et al. | |
| 5,926,624 A | 7/1999 | Katz et al. | |
| 5,928,327 A | 7/1999 | Wang et al. | |
| 5,929,849 A | 7/1999 | Kikinis | |
| 5,929,850 A | 7/1999 | Broadwin et al. | |
| 5,930,444 A | 7/1999 | Camhi et al. | |
| 5,930,473 A | 7/1999 | Teng et al. | |
| 5,930,493 A | 7/1999 | Ottesen et al. | |
| 5,931,901 A | 8/1999 | Wolfe et al. | |
| 5,933,603 A | 8/1999 | Vahalia et al. | |
| 5,933,835 A | 8/1999 | Adams et al. | |
| 5,935,206 A | 8/1999 | Dixon et al. | |
| 5,936,569 A | 8/1999 | Ståhle et al. | |
| 5,936,673 A | 8/1999 | Agarwal | |
| 5,940,071 A | 8/1999 | Treffers et al. | |
| 5,940,073 A | 8/1999 | Klosterman et al. | |
| 5,943,046 A | 8/1999 | Cave et al. | |
| 5,943,047 A | 8/1999 | Suzuki | |
| 5,945,987 A | 8/1999 | Dunn | |
| 5,945,988 A | 8/1999 | Williams et al. | |
| 5,947,746 A | 9/1999 | Tsai | |
| 5,949,411 A | 9/1999 | Doerr et al. | |
| 5,956,482 A | 9/1999 | Agraharam et al. | |
| 5,956,716 A * | 9/1999 | Kenner | G06F 17/30017 707/E17.116 |
| 5,957,695 A * | 9/1999 | Redford et al. | 434/307 R |
| 5,959,659 A | 9/1999 | Dokic | |
| 5,961,603 A | 10/1999 | Kunkel et al. | |
| 5,963,202 A | 10/1999 | Polish | |
| 5,964,455 A | 10/1999 | Catanzarite et al. | |
| 5,969,283 A | 10/1999 | Looney et al. | |
| 5,969,714 A | 10/1999 | Butcher | |
| 5,973,680 A | 10/1999 | Ueda | |
| 5,973,722 A | 10/1999 | Wakai et al. | |
| 5,974,217 A | 10/1999 | Haraguchi | |
| 5,977,963 A | 11/1999 | Gaughan et al. | |
| 5,977,964 A | 11/1999 | Williams et al. | |
| 5,978,567 A | 11/1999 | Rebane et al. | |
| 5,978,843 A | 11/1999 | Wu et al. | |
| 5,986,650 A | 11/1999 | Ellis et al. | |
| 5,987,454 A | 11/1999 | Hobbs | |
| 5,990,881 A | 11/1999 | Inoue et al. | |
| 5,999,688 A | 12/1999 | Iggulden et al. | |

(56) References Cited

U.S. PATENT DOCUMENTS

| | | | |
|---|---|---|---|
| 5,999,970 A | 12/1999 | Krisbergh et al. | |
| 6,002,394 A | 12/1999 | Schein et al. | |
| 6,002,720 A | 12/1999 | Yurt et al. | |
| 6,005,564 A | 12/1999 | Ahmad et al. | |
| 6,005,600 A | 12/1999 | Hill | |
| 6,008,802 A | 12/1999 | Iki et al. | |
| 6,009,465 A | 12/1999 | Decker et al. | |
| 6,012,089 A | 1/2000 | Hasegawa | |
| 6,012,091 A | 1/2000 | Boyce | |
| 6,014,184 A | 1/2000 | Knee et al. | |
| 6,014,381 A | 1/2000 | Troxel et al. | |
| 6,014,693 A | 1/2000 | Ito et al. | |
| 6,014,694 A | 1/2000 | Aharoni et al. | |
| 6,014,706 A | 1/2000 | Cannon et al. | |
| 6,018,359 A | 1/2000 | Kermode et al. | |
| 6,018,765 A | 1/2000 | Durana et al. | |
| 6,020,912 A | 2/2000 | De Lang | |
| 6,022,223 A | 2/2000 | Taniguchi et al. | |
| 6,023,725 A | 2/2000 | Ozawa et al. | |
| 6,025,837 A | 2/2000 | Matthews, III et al. | |
| 6,025,868 A | 2/2000 | Russo | |
| 6,028,600 A | 2/2000 | Rosin et al. | |
| 6,028,603 A | 2/2000 | Wang et al. | |
| 6,029,064 A | 2/2000 | Farris et al. | |
| 6,032,202 A | 2/2000 | Lea et al. | |
| 6,038,544 A * | 3/2000 | Machin et al. | 705/7.14 |
| 6,038,591 A | 3/2000 | Wolfe et al. | |
| 6,038,614 A | 3/2000 | Chan et al. | |
| 6,049,831 A | 4/2000 | Gardell et al. | |
| 6,052,145 A | 4/2000 | Macrae et al. | |
| 6,064,380 A | 5/2000 | Swenson et al. | |
| 6,075,530 A | 6/2000 | Lucas et al. | |
| 6,085,236 A | 7/2000 | Lea | |
| 6,091,823 A | 7/2000 | Hosomi et al. | |
| 6,091,883 A | 7/2000 | Artigalas et al. | |
| 6,098,082 A | 8/2000 | Gibbon et al. | |
| 6,111,677 A | 8/2000 | Shintani et al. | |
| 6,118,450 A | 9/2000 | Proehl et al. | |
| 6,125,230 A | 9/2000 | Yaginuma | |
| 6,141,003 A | 10/2000 | Chor et al. | |
| 6,141,488 A | 10/2000 | Knudson et al. | |
| 6,141,693 A | 10/2000 | Perlman et al. | |
| 6,147,715 A | 11/2000 | Yuen et al. | |
| 6,154,206 A | 11/2000 | Ludtke | |
| 6,160,546 A | 12/2000 | Thompson et al. | |
| 6,160,796 A | 12/2000 | Zou et al. | |
| 6,166,730 A | 12/2000 | Goode et al. | |
| 6,166,735 A | 12/2000 | Dom et al. | |
| 6,167,188 A | 12/2000 | Young et al. | |
| 6,169,725 B1 | 1/2001 | Gibbs et al. | |
| 6,170,006 B1 | 1/2001 | Namba | |
| 6,172,674 B1 * | 1/2001 | Etheredge | 715/721 |
| 6,172,712 B1 | 1/2001 | Beard | |
| 6,177,931 B1 | 1/2001 | Alexander et al. | |
| 6,181,867 B1 * | 1/2001 | Kenner et al. | 386/326 |
| 6,182,094 B1 | 1/2001 | Humpleman et al. | |
| 6,184,878 B1 | 2/2001 | Alonso et al. | |
| 6,185,573 B1 * | 2/2001 | Angelucci | G06F 17/30017 707/E17.009 |
| 6,185,621 B1 | 2/2001 | Romine | |
| 6,208,335 B1 | 3/2001 | Gordon et al. | |
| 6,208,341 B1 | 3/2001 | van Ee et al. | |
| 6,209,103 B1 | 3/2001 | Schreiber et al. | |
| 6,219,839 B1 | 4/2001 | Sampsell | |
| 6,226,030 B1 * | 5/2001 | Harvey | H04L 29/06 348/E7.073 |
| 6,230,325 B1 | 5/2001 | Iinuma et al. | |
| 6,232,539 B1 | 5/2001 | Looney et al. | |
| 6,236,395 B1 | 5/2001 | Sezan et al. | |
| 6,237,049 B1 | 5/2001 | Ludtke | |
| 6,243,419 B1 | 6/2001 | Satou et al. | |
| 6,243,707 B1 | 6/2001 | Humpleman et al. | |
| 6,243,725 B1 | 6/2001 | Hempleman et al. | |
| 6,246,719 B1 | 6/2001 | Agarwal | |
| 6,263,503 B1 | 7/2001 | Margulis | |
| 6,263,507 B1 * | 7/2001 | Ahmad et al. | 725/134 |
| 6,266,657 B1 | 7/2001 | deVries et al. | |
| 6,268,394 B1 * | 7/2001 | Shaikenov et al. | 514/469 |
| 6,269,394 B1 * | 7/2001 | Kenner et al. | 709/217 |
| 6,271,840 B1 | 8/2001 | Finseth et al. | |
| 6,275,268 B1 | 8/2001 | Ellis et al. | |
| 6,275,532 B1 | 8/2001 | Hibi et al. | |
| 6,275,829 B1 | 8/2001 | Angiulo et al. | |
| 6,278,466 B1 * | 8/2001 | Chen | 345/473 |
| 6,289,165 B1 | 9/2001 | Abecassis | |
| 6,305,019 B1 | 10/2001 | Dyer et al. | |
| 6,311,011 B1 | 10/2001 | Kuroda | |
| 6,314,432 B1 | 11/2001 | Potts | |
| 6,314,575 B1 | 11/2001 | Billock et al. | |
| 6,324,338 B1 | 11/2001 | Wood et al. | |
| 6,324,538 B1 | 11/2001 | Wesinger, Jr. et al. | |
| 6,330,665 B1 * | 12/2001 | Wise et al. | 711/E12.003 |
| 6,349,410 B1 | 2/2002 | Lortz | |
| 6,351,765 B1 | 2/2002 | Pietropaolo et al. | |
| 6,353,700 B1 | 3/2002 | Zhou | |
| 6,356,971 B1 | 3/2002 | Katz et al. | |
| 6,357,042 B2 | 3/2002 | Srinivasan et al. | |
| 6,359,661 B1 | 3/2002 | Nickum | |
| 6,370,543 B2 * | 4/2002 | Hoffert et al. | 725/113 |
| 6,388,714 B1 | 5/2002 | Schein et al. | |
| 6,393,430 B1 | 5/2002 | Van Ryzin | |
| 6,397,387 B1 * | 5/2002 | Rosin et al. | 725/44 |
| 6,430,357 B1 * | 8/2002 | Orr | 386/244 |
| 6,433,835 B1 | 8/2002 | Hartson et al. | |
| 6,441,832 B1 | 8/2002 | Tao et al. | |
| 6,449,608 B1 * | 9/2002 | Morita et al. | 386/278 |
| 6,449,767 B1 | 9/2002 | Krapf et al. | |
| 6,456,621 B1 | 9/2002 | Wada et al. | |
| RE37,881 E | 10/2002 | Haines | |
| 6,466,080 B2 | 10/2002 | Kawai et al. | |
| 6,473,463 B2 | 10/2002 | Agarwal | |
| 6,473,559 B1 | 10/2002 | Knudson et al. | |
| 6,483,986 B1 | 11/2002 | Krapf | |
| 6,487,145 B1 | 11/2002 | Berhan | |
| 6,487,362 B1 | 11/2002 | Yuen et al. | |
| 6,496,856 B1 | 12/2002 | Kenner et al. | |
| 6,496,981 B1 | 12/2002 | Wistendahl et al. | |
| 6,498,895 B2 | 12/2002 | Young et al. | |
| 6,505,348 B1 | 1/2003 | Knowles et al. | |
| 6,564,378 B1 | 5/2003 | Satterfield et al. | |
| 6,573,907 B1 | 6/2003 | Madrane | |
| 6,577,735 B1 | 6/2003 | Bharat | |
| 6,578,070 B1 | 6/2003 | Weaver et al. | |
| 6,594,699 B1 | 7/2003 | Sahai et al. | |
| 6,594,826 B1 * | 7/2003 | Rao et al. | 725/95 |
| 6,647,417 B1 | 11/2003 | Hunter et al. | |
| 6,654,933 B1 | 11/2003 | Abbott et al. | |
| 6,657,116 B1 | 12/2003 | Gunnerson | |
| 6,668,377 B1 * | 12/2003 | Dunn | 725/92 |
| 6,671,882 B1 | 12/2003 | Murphy et al. | |
| 6,675,384 B1 * | 1/2004 | Block et al. | 725/28 |
| 6,701,060 B2 | 3/2004 | Yuen et al. | |
| 6,741,617 B2 | 5/2004 | Rosengren et al. | |
| 6,746,127 B2 | 6/2004 | Suyama | |
| 6,751,402 B1 | 6/2004 | Elliott et al. | |
| 6,751,802 B1 | 6/2004 | Huizer et al. | |
| 6,756,997 B1 | 6/2004 | Ward, III et al. | |
| 6,760,758 B1 | 7/2004 | Lund et al. | |
| 6,769,127 B1 | 7/2004 | Bonomi et al. | |
| 6,799,174 B2 | 9/2004 | Chipman et al. | |
| 6,816,175 B1 | 11/2004 | Hamp et al. | |
| 6,816,904 B1 | 11/2004 | Ludwig et al. | |
| 6,820,278 B1 | 11/2004 | Ellis | |
| 6,826,512 B2 | 11/2004 | Dara-Abrams et al. | |
| 6,837,789 B2 | 1/2005 | Garahi et al. | |
| 6,839,769 B2 | 1/2005 | Needham et al. | |
| 6,859,799 B1 * | 2/2005 | Yuen | 715/760 |
| 6,868,225 B1 | 3/2005 | Brown et al. | |
| 6,868,551 B1 * | 3/2005 | Lawler et al. | 725/40 |
| 6,869,799 B1 | 3/2005 | Guan et al. | |
| 6,882,793 B1 | 4/2005 | Fu et al. | |
| 6,901,603 B2 | 5/2005 | Zeidler et al. | |
| 6,925,496 B1 | 8/2005 | Behl | |
| 6,931,593 B1 | 8/2005 | Grooters | |

(56) References Cited

U.S. PATENT DOCUMENTS

| | | | |
|---|---|---|---|
| 6,938,101 B2 | 8/2005 | Hayes et al. | |
| 6,950,624 B2 | 9/2005 | Kim et al. | |
| 6,956,573 B1 * | 10/2005 | Bergen | G06F 17/30802 |
| | | | 707/E17.028 |
| 6,973,474 B2 | 12/2005 | Hatayama | |
| 6,993,788 B1 | 1/2006 | Lawrence et al. | |
| 7,035,804 B2 | 4/2006 | Saindon et al. | |
| 7,039,643 B2 | 5/2006 | Sena et al. | |
| 7,047,377 B2 | 5/2006 | Elder et al. | |
| 7,058,635 B1 | 6/2006 | Shah-Nazaroff et al. | |
| 7,086,077 B2 | 8/2006 | Giammaressi | |
| 7,098,958 B2 | 8/2006 | Wredenhagen et al. | |
| 7,100,192 B1 * | 8/2006 | Igawa | H04L 29/06027 |
| | | | 709/217 |
| 7,103,906 B1 | 9/2006 | Katz et al. | |
| 7,117,519 B1 | 10/2006 | Anderson et al. | |
| 7,127,735 B1 | 10/2006 | Lee et al. | |
| 7,143,432 B1 | 11/2006 | Brooks et al. | |
| 7,155,451 B1 | 12/2006 | Torres | |
| 7,159,232 B1 | 1/2007 | Blackketter et al. | |
| 7,159,235 B2 | 1/2007 | Son et al. | |
| 7,168,086 B1 | 1/2007 | Carpenter et al. | |
| 7,178,161 B1 | 2/2007 | Fristoe et al. | |
| 7,213,071 B2 | 5/2007 | DeLima et | |
| 7,231,175 B2 | 6/2007 | Ellis | |
| 7,237,253 B1 | 6/2007 | Blackketter et al. | |
| 7,240,356 B2 | 7/2007 | Iki et al. | |
| 7,242,324 B2 | 7/2007 | Lai et al. | |
| 7,248,778 B1 | 7/2007 | Anderson et al. | |
| 7,260,461 B2 | 8/2007 | Rao et al. | |
| 7,263,709 B1 | 8/2007 | Krapf | |
| 7,269,733 B1 | 9/2007 | O'Toole, Jr. | |
| 7,292,774 B1 | 11/2007 | Masters et al. | |
| 7,302,697 B1 | 11/2007 | Wilson et al. | |
| 7,305,254 B2 | 12/2007 | Findikli | |
| 7,328,450 B2 | 2/2008 | Macrae et al. | |
| 7,346,920 B2 | 3/2008 | Lamkin et al. | |
| 7,356,246 B1 | 4/2008 | Kobb | |
| 7,366,199 B1 | 4/2008 | Vaughan et al. | |
| 7,372,976 B2 | 5/2008 | Rhoads et al. | |
| 7,483,964 B1 | 1/2009 | Jackson et al. | |
| 7,536,706 B1 * | 5/2009 | Sezan et al. | 725/113 |
| 7,574,723 B2 | 8/2009 | Putterman et al. | |
| 7,624,337 B2 | 11/2009 | Sull et al. | |
| 7,643,649 B2 * | 1/2010 | Davis | G06F 17/30876 |
| | | | 382/100 |
| 7,650,621 B2 | 1/2010 | Thomas et al. | |
| 7,684,673 B2 | 3/2010 | Monroe | |
| 7,689,510 B2 | 3/2010 | Lamkin et al. | |
| 7,761,892 B2 | 7/2010 | Ellis et al. | |
| 7,769,775 B2 | 8/2010 | Yuen | |
| 7,787,010 B2 | 8/2010 | DiFrancesco | |
| 7,793,326 B2 | 9/2010 | McCoskey et al. | |
| 7,840,977 B2 | 11/2010 | Walker et al. | |
| 7,877,766 B1 | 1/2011 | Wu et al. | |
| 7,917,933 B2 | 3/2011 | Thomas et al. | |
| 7,929,551 B2 | 4/2011 | Dietrich et al. | |
| RE42,728 E * | 9/2011 | Madrane | 715/716 |
| 8,082,568 B2 | 12/2011 | Ellis | |
| 8,584,184 B2 | 11/2013 | Thomas et al. | |
| 2001/0004338 A1 | 6/2001 | Yankowski | |
| 2001/0007147 A1 | 7/2001 | Goldschmidt Iki et al. | |
| 2001/0018693 A1 * | 8/2001 | Jain et al. | 707/500 |
| 2001/0022815 A1 | 9/2001 | Agarwal | |
| 2001/0026287 A1 | 10/2001 | Watanabe | |
| 2001/0033343 A1 | 10/2001 | Yap et al. | |
| 2001/0039660 A1 | 11/2001 | Vasilevsky et al. | |
| 2001/0042098 A1 * | 11/2001 | Gupta et al. | 709/206 |
| 2001/0042107 A1 | 11/2001 | Palm | |
| 2001/0043700 A1 | 11/2001 | Shima et al. | |
| 2002/0010652 A1 | 1/2002 | Deguchi | |
| 2002/0026639 A1 | 2/2002 | Haneda | |
| 2002/0028026 A1 * | 3/2002 | Chen et al. | 382/284 |
| 2002/0043700 A1 | 4/2002 | Sasaki et al. | |
| 2002/0046315 A1 | 4/2002 | Miller et al. | |
| 2002/0056087 A1 | 5/2002 | Berezowski et al. | |
| 2002/0059342 A1 * | 5/2002 | Gupta et al. | 707/512 |
| 2002/0059588 A1 | 5/2002 | Huber et al. | |
| 2002/0059621 A1 | 5/2002 | Thomas et al. | |
| 2002/0059642 A1 | 5/2002 | Russ et al. | |
| 2002/0069218 A1 | 6/2002 | Sull et al. | |
| 2002/0069746 A1 | 6/2002 | Taira et al. | |
| 2002/0070982 A1 | 6/2002 | Hill et al. | |
| 2002/0078293 A1 | 6/2002 | Kou et al. | |
| 2002/0082901 A1 | 6/2002 | Dunning et al. | |
| 2002/0087588 A1 | 7/2002 | McBride et al. | |
| 2002/0088011 A1 | 7/2002 | Lamkin et al. | |
| 2002/0104091 A1 | 8/2002 | Prabhu et al. | |
| 2002/0113824 A1 | 8/2002 | Myers | |
| 2002/0116509 A1 | 8/2002 | DeLaHuerga | |
| 2002/0120935 A1 | 8/2002 | Huber et al. | |
| 2002/0138843 A1 * | 9/2002 | Samaan et al. | 725/87 |
| 2002/0166120 A1 * | 11/2002 | Boylan et al. | 725/35 |
| 2002/0166123 A1 | 11/2002 | Schrader et al. | |
| 2002/0174430 A1 | 11/2002 | Ellis et al. | |
| 2002/0174444 A1 | 11/2002 | Gatto et al. | |
| 2002/0180803 A1 | 12/2002 | Kaplan et al. | |
| 2002/0188735 A1 | 12/2002 | Needham et al. | |
| 2002/0194011 A1 | 12/2002 | Boies et al. | |
| 2003/0005446 A1 | 1/2003 | Jaff et al. | |
| 2003/0035404 A1 | 2/2003 | Ozluturk et al. | |
| 2003/0037068 A1 | 2/2003 | Thomas et al. | |
| 2003/0046437 A1 | 3/2003 | Eytchison et al. | |
| 2003/0066084 A1 | 4/2003 | Kaars | |
| 2003/0066092 A1 | 4/2003 | Wagner et al. | |
| 2003/0068154 A1 | 4/2003 | Zylka | |
| 2003/0088554 A1 | 5/2003 | Ryan et al. | |
| 2003/0088613 A1 | 5/2003 | Goldschmidt Iki et al. | |
| 2003/0101104 A1 | 5/2003 | Dimitrova et al. | |
| 2003/0103645 A1 | 6/2003 | Levy et al. | |
| 2003/0105813 A1 | 6/2003 | Mizutani | |
| 2003/0110499 A1 | 6/2003 | Knudson et al. | |
| 2003/0135860 A1 | 7/2003 | Dureau | |
| 2003/0152096 A1 | 8/2003 | Chapman | |
| 2003/0162096 A1 | 8/2003 | Michot et al. | |
| 2003/0163832 A1 | 8/2003 | Tsuria et al. | |
| 2003/0194260 A1 | 10/2003 | Ward et al. | |
| 2003/0206710 A1 | 11/2003 | Ferman et al. | |
| 2003/0214955 A1 | 11/2003 | Kim | |
| 2003/0237085 A1 | 12/2003 | Boston et al. | |
| 2004/0008972 A1 | 1/2004 | Haken | |
| 2004/0056879 A1 * | 3/2004 | Erdelyi | 345/716 |
| 2004/0088731 A1 | 5/2004 | Putterman et al. | |
| 2004/0101271 A1 | 5/2004 | Boston et al. | |
| 2004/0117831 A1 | 6/2004 | Ellis et al. | |
| 2004/0128514 A1 | 7/2004 | Rhoads | |
| 2004/0128686 A1 | 7/2004 | Boyer et al. | |
| 2004/0139233 A1 | 7/2004 | Kellerman et al. | |
| 2004/0156614 A1 | 8/2004 | Bumgardner et al. | |
| 2004/0181814 A1 | 9/2004 | Ellis et al. | |
| 2004/0220091 A1 | 11/2004 | Adam et al. | |
| 2004/0226034 A1 | 11/2004 | Kaczowka et al. | |
| 2004/0226042 A1 * | 11/2004 | Ellis | 725/43 |
| 2004/0237104 A1 | 11/2004 | Cooper et al. | |
| 2004/0255326 A1 | 12/2004 | Hicks et al. | |
| 2004/0259537 A1 | 12/2004 | Ackley | |
| 2004/0267965 A1 | 12/2004 | Vasudevan et al. | |
| 2005/0013462 A1 | 1/2005 | Rhoads | |
| 2005/0028208 A1 | 2/2005 | Ellis et al. | |
| 2005/0033760 A1 * | 2/2005 | Fuller et al. | 707/100 |
| 2005/0039208 A1 | 2/2005 | Veeck et al. | |
| 2005/0046174 A1 | 3/2005 | Botes | |
| 2005/0071876 A1 | 3/2005 | van Beek | |
| 2005/0081159 A1 * | 4/2005 | Gupta et al. | 715/751 |
| 2005/0102324 A1 | 5/2005 | Spring et al. | |
| 2005/0120373 A1 | 6/2005 | Thomas et al. | |
| 2005/0132264 A1 | 6/2005 | Joshi et al. | |
| 2005/0138137 A1 | 6/2005 | Encarnacion et al. | |
| 2005/0138658 A1 | 6/2005 | Bryan | |
| 2005/0177859 A1 * | 8/2005 | Valentino et al. | 725/105 |
| 2005/0204388 A1 | 9/2005 | Knudson et al. | |
| 2005/0210526 A1 * | 9/2005 | Levy et al. | 725/113 |
| 2005/0227611 A1 | 10/2005 | Ellis | |
| 2005/0246393 A1 | 11/2005 | Coates et al. | |

(56) References Cited

U.S. PATENT DOCUMENTS

| | | | |
|---|---|---|---|
| 2005/0251827 A1 | 11/2005 | Ellis et al. | |
| 2006/0004685 A1 | 1/2006 | Pyhalammi et al. | |
| 2006/0015888 A1 | 1/2006 | Shih | |
| 2006/0031883 A1 | 2/2006 | Ellis et al. | |
| 2006/0037054 A1 | 2/2006 | McDowell et al. | |
| 2006/0064728 A1 | 3/2006 | Son et al. | |
| 2006/0080707 A1 | 4/2006 | Laksono | |
| 2006/0085835 A1 | 4/2006 | Istvan et al. | |
| 2006/0090186 A1 | 4/2006 | Santangelo et al. | |
| 2006/0095942 A1 | 5/2006 | van Beek | |
| 2006/0173838 A1 | 8/2006 | Garg et al. | |
| 2006/0215650 A1 | 9/2006 | Wollmershauser et al. | |
| 2006/0238648 A1 | 10/2006 | Wogsberg | |
| 2006/0248570 A1 | 11/2006 | Witwer | |
| 2006/0253874 A1 | 11/2006 | Stark et al. | |
| 2006/0259949 A1 | 11/2006 | Schaefer et al. | |
| 2006/0271953 A1 | 11/2006 | Jacoby et al. | |
| 2007/0011206 A1* | 1/2007 | Gupta et al. | 707/104.1 |
| 2007/0011709 A1 | 1/2007 | Katz et al. | |
| 2007/0022442 A1 | 1/2007 | Gil et al. | |
| 2007/0028267 A1 | 2/2007 | Ostojic et al. | |
| 2007/0055689 A1 | 3/2007 | Rhoads et al. | |
| 2007/0055980 A1 | 3/2007 | Megeid et al. | |
| 2007/0089160 A1 | 4/2007 | Ando | |
| 2007/0094702 A1 | 4/2007 | Khare et al. | |
| 2007/0124781 A1 | 5/2007 | Casey et al. | |
| 2007/0147351 A1 | 6/2007 | Dietrich et al. | |
| 2007/0157234 A1 | 7/2007 | Walker | |
| 2007/0157240 A1 | 7/2007 | Walker | |
| 2007/0157241 A1 | 7/2007 | Walker | |
| 2007/0157242 A1 | 7/2007 | Cordray et al. | |
| 2007/0157260 A1 | 7/2007 | Walker | |
| 2007/0157266 A1 | 7/2007 | Ellis et al. | |
| 2007/0162661 A1 | 7/2007 | Fu et al. | |
| 2007/0174774 A1 | 7/2007 | Lerman et al. | |
| 2007/0198659 A1 | 8/2007 | Lam | |
| 2007/0220024 A1 | 9/2007 | Putterman et al. | |
| 2007/0220580 A1 | 9/2007 | Putterman et al. | |
| 2007/0255755 A1* | 11/2007 | Zhang et al. | 707/104.1 |
| 2007/0282969 A1 | 12/2007 | Dietrich et al. | |
| 2007/0283046 A1 | 12/2007 | Dietrich et al. | |
| 2008/0034396 A1 | 2/2008 | Lev | |
| 2008/0060001 A1 | 3/2008 | Logan et al. | |
| 2008/0133378 A1 | 6/2008 | Tobin | |
| 2008/0263227 A1 | 10/2008 | Roberts et al. | |
| 2008/0307477 A1 | 12/2008 | Omernick | |
| 2009/0019492 A1 | 1/2009 | Grasset | |
| 2009/0094113 A1* | 4/2009 | Berry et al. | 705/14 |
| 2009/0138922 A1 | 5/2009 | Thomas et al. | |
| 2009/0271286 A1 | 10/2009 | Tobin | |
| 2010/0186034 A1 | 7/2010 | Walker | |
| 2011/0004897 A1* | 1/2011 | Alexander et al. | 725/32 |
| 2011/0131607 A1 | 6/2011 | Thomas et al. | |
| 2011/0185392 A1 | 7/2011 | Walker | |
| 2012/0192232 A1* | 7/2012 | Ellis | 725/41 |
| 2012/0209843 A1* | 8/2012 | deVries et al. | 707/736 |
| 2012/0239661 A1* | 9/2012 | Giblin | 707/741 |
| 2014/0040938 A1 | 2/2014 | Thomas et al. | |
| 2014/0105573 A1* | 4/2014 | Hanckmann et al. | 386/241 |

FOREIGN PATENT DOCUMENTS

| | | |
|---|---|---|
| EP | 0424469 | 5/1991 |
| EP | 0472521 | 3/1992 |
| EP | 0525427 | 2/1993 |
| EP | 0535749 A2 | 4/1993 |
| EP | 0 572 090 | 12/1993 |
| EP | 0 583 196 A1 | 2/1994 |
| EP | 0605115 A2 | 7/1994 |
| EP | 0624039 A2 | 11/1994 |
| EP | 0662771 A1 | 7/1995 |
| EP | 0673160 A1 | 9/1995 |
| EP | 0 682 452 A2 | 11/1995 |
| EP | 0711076 A2 | 5/1996 |
| EP | 0725539 A2 | 8/1996 |
| EP | 0751648 | 1/1997 |
| EP | 0753964 | 1/1997 |
| EP | 0757873 A1 | 2/1997 |
| EP | 0758833 A2 | 2/1997 |
| EP | 0762756 A2 | 3/1997 |
| EP | 0763938 | 3/1997 |
| EP | 0 806 111 A1 | 11/1997 |
| EP | 0821856 A1 | 2/1998 |
| EP | 0 836 321 | 4/1998 |
| EP | 0 854 645 | 7/1998 |
| EP | 0874524 | 10/1998 |
| EP | 0880856 A1 | 12/1998 |
| EP | 0924927 | 6/1999 |
| EP | 0932275 | 7/1999 |
| EP | 0940985 | 9/1999 |
| EP | 0944253 A1 | 9/1999 |
| EP | 0944257 A1 | 9/1999 |
| EP | 0969662 A1 | 1/2000 |
| EP | 0986046 A1 | 3/2000 |
| EP | 1099341 A1 | 5/2001 |
| EP | 1213919 A2 | 6/2002 |
| EP | 1217787 A2 | 6/2002 |
| EP | 1 237 372 A1 | 9/2002 |
| EP | 1 244 300 A1 | 9/2002 |
| EP | 1327209 A2 | 7/2003 |
| EP | 1377049 A1 | 1/2004 |
| EP | 1427148 A1 | 6/2004 |
| EP | 1613066 A2 | 1/2006 |
| EP | 1763234 A2 | 3/2007 |
| GB | 2 256 115 | 11/1992 |
| GB | 2 307 628 A | 5/1997 |
| JP | 60061935 A | 4/1985 |
| JP | 06111413 | 4/1994 |
| JP | 06303541 | 10/1994 |
| JP | 07-336318 | 12/1995 |
| JP | 09-138804 | 5/1997 |
| JP | 09-214873 | 8/1997 |
| JP | 10-65978 | 3/1998 |
| JP | 11 032272 | 2/1999 |
| JP | 11 205711 | 7/1999 |
| JP | 11177962 A | 7/1999 |
| JP | H11-341040 A | 12/1999 |
| JP | 2000-004272 | 1/2000 |
| JP | 2001 527709 | 12/2001 |
| JP | 2003-162444 A | 6/2003 |
| JP | 2003-209893 A | 7/2003 |
| JP | 2006-008052 A | 4/2006 |
| KP | 1019970078662 | 12/1997 |
| KR | 1999-0086454 | 12/1999 |
| KR | 2000-0059522 | 10/2000 |
| WO | WO-98/04507 A1 | 6/1988 |
| WO | WO-89/12370 A1 | 12/1989 |
| WO | WO-90/00847 A1 | 1/1990 |
| WO | WO-91/00670 A1 | 1/1991 |
| WO | WO-91/07050 A1 | 5/1991 |
| WO | WO-92/04801 A1 | 3/1992 |
| WO | WO-9222983 A2 | 12/1992 |
| WO | WO-93/08542 A1 | 4/1993 |
| WO | WO-93/22877 A2 | 11/1993 |
| WO | WO-94/14284 A1 | 6/1994 |
| WO | WO-95/01058 A1 | 1/1995 |
| WO | WO-9502945 A1 | 1/1995 |
| WO | WO-9504431 A2 | 2/1995 |
| WO | WO-95/15658 A1 | 6/1995 |
| WO | WO-95/31069 A1 | 11/1995 |
| WO | WO-95/32583 A1 | 11/1995 |
| WO | WO-95/32584 A1 | 11/1995 |
| WO | WO-95/32585 A1 | 11/1995 |
| WO | WO-95/32587 A1 | 11/1995 |
| WO | WO-96/09721 A1 | 3/1996 |
| WO | WO-96/17467 A1 | 6/1996 |
| WO | WO-96/25821 A1 | 8/1996 |
| WO | WO-96/31980 A1 | 10/1996 |
| WO | WO-96/33572 A1 | 10/1996 |
| WO | WO-96/34467 A1 | 10/1996 |
| WO | WO-96/34491 A1 | 10/1996 |
| WO | WO-96/41472 A1 | 12/1996 |
| WO | WO-9641285 | 12/1996 |

(56) References Cited

FOREIGN PATENT DOCUMENTS

| | | |
|---|---|---|
| WO | WO-9641478 A1 | 12/1996 |
| WO | WO-97/12342 | 4/1997 |
| WO | WO-97/13368 A1 | 4/1997 |
| WO | WO-97/21291 A2 | 6/1997 |
| WO | WO-97/32434 A1 | 9/1997 |
| WO | WO-97/34414 A1 | 9/1997 |
| WO | WO-9734413 A1 | 9/1997 |
| WO | WO-97/37500 A1 | 10/1997 |
| WO | WO-97/42763 A1 | 11/1997 |
| WO | WO-97/46016 A1 | 12/1997 |
| WO | WO-97/46943 A1 | 12/1997 |
| WO | WO-97/47124 A1 | 12/1997 |
| WO | WO-97/48228 A1 | 12/1997 |
| WO | WO-97/49237 A1 | 12/1997 |
| WO | WO-9746950 | 12/1997 |
| WO | WO-98/01995 A1 | 1/1998 |
| WO | WO-98/07277 A1 | 2/1998 |
| WO | WO-98/10589 A1 | 3/1998 |
| WO | WO-98/12872 A1 | 3/1998 |
| WO | WO-98/17033 A1 | 4/1998 |
| WO | WO-98/17064 A1 | 4/1998 |
| WO | WO-98/18260 A1 | 4/1998 |
| WO | WO-98/19459 A1 | 5/1998 |
| WO | WO-98/26528 | 6/1998 |
| WO | WO-98/26584 A1 | 6/1998 |
| WO | WO-98/26596 A1 | 6/1998 |
| WO | WO-98/31115 A2 | 7/1998 |
| WO | WO-98/31116 A2 | 7/1998 |
| WO | WO-98/34405 A1 | 8/1998 |
| WO | WO-98/38831 A1 | 9/1998 |
| WO | WO-98/47279 A2 | 10/1998 |
| WO | WO-98/47283 A1 | 10/1998 |
| WO | WO-98/48566 A2 | 10/1998 |
| WO | WO-9847084 | 10/1998 |
| WO | WO-98/53611 A1 | 11/1998 |
| WO | WO-99/03267 A1 | 1/1999 |
| WO | WO-99/04561 A1 | 1/1999 |
| WO | WO-99/11060 A1 | 3/1999 |
| WO | WO-99/12320 A1 | 3/1999 |
| WO | WO-99/14945 | 3/1999 |
| WO | WO-99/27681 A2 | 6/1999 |
| WO | WO-99/28897 A1 | 6/1999 |
| WO | WO-99/35753 A2 | 7/1999 |
| WO | WO-99/39466 A1 | 8/1999 |
| WO | WO-99/56473 A1 | 11/1999 |
| WO | WO-99/60790 A1 | 11/1999 |
| WO | WO-99/64969 A2 | 12/1999 |
| WO | WO-99/65244 A1 | 12/1999 |
| WO | WO-99/66725 A1 | 12/1999 |
| WO | WO-00/04706 A2 | 1/2000 |
| WO | WO-00/04707 | 1/2000 |
| WO | WO-00/04709 A1 | 1/2000 |
| WO | WO-00/05885 A1 | 2/2000 |
| WO | WO-00/11869 A1 | 3/2000 |
| WO | WO-00/177358 A1 | 3/2000 |
| WO | WO-0016548 A1 | 3/2000 |
| WO | WO-00/30345 A1 | 5/2000 |
| WO | WO-00/33208 A2 | 6/2000 |
| WO | WO-00/33560 | 6/2000 |
| WO | WO-00/34891 A2 | 6/2000 |
| WO | WO-0033565 A2 | 6/2000 |
| WO | WO-00/58967 A1 | 10/2000 |
| WO | WO-00/59230 A1 | 10/2000 |
| WO | WO-00/74383 A1 | 12/2000 |
| WO | WO-01/01677 A1 | 1/2001 |
| WO | WO-01/01689 A1 | 1/2001 |
| WO | WO 01/10126 | 2/2001 |
| WO | WO-01/35662 A1 | 5/2001 |
| WO | WO-01/50743 A1 | 7/2001 |
| WO | WO-01/67772 | 9/2001 |
| WO | WO-03040727 A1 | 6/2003 |
| WO | WO-2004032511 A1 | 4/2004 |
| WO | WO-2004/061699 | 7/2004 |
| WO | WO-2007078503 A2 | 7/2007 |

OTHER PUBLICATIONS

Raif O. Onvural, Hal Sandick, Rao Cherukuri—"Structure and use of signaling in B-ISDNs"—Computer Networks and ISDN Systems—vol. 28, Issue 3, Jan. 1996, pp. 307-323.*

Giovanni Caire—"ATMAN: Trading of digital audio visual contents"—Multimedia Applications, Services and Techniques—ECMAST'98—vol. 1425 of the series Lecture Notes in Computer Science—pp. 352-365—Date: Jul. 29, 2005.*

Abbott et al.; "Video Formats and Resolutions", Nuclear Plan Journal, 1994, pp. 1-11.

Apers et al., "Content-based retrieval in Multimedia databases based on feature models"—Advanced Multimedia Content, Springer Berlin/Heidelberg vol. 1554, Jan. 1999 (pp. 119-130).

Bryhni et al. "On-demand Regional Television over the Internet." ACM Multimedia '96 Boston MA USA 1996 ACM (pp. 99-107).

Chiuch—"Content-based Image Indexing"—Proc. Of the 20th International Conference on Very Large Database 1994 (pp. 582-593).

Harmandas V. et al., "Image retrieval by hypertext links"—Proceedings of the 20th Annual International ACM-SIGIR Conference on Research and Development in Information Retrieval Jul. 27, 1997 (pp. 296-303).

Harrison, "A review of multimedia technology and dissemination systems," Electronic Publishing 7:3:117-146 (1994).

International Business Machines Corporation, Research Disclosure, "Use of close captioning for indexing and retrieval of video"—Mason Publications, Hampshire, Great Britain, vol. 413, No. 125, Sep. 1998.

Lienhart—"Automatic text recognition for video indexing"—Proc. Of the Fourth ACM International Conference on Multimedia, ACM 1996 (pp. 11-20).

Maltins, "Movie and Video Guide—for Palm Powered Handhelds", New York, Net Book, 1992, Landware.com, pp. 1-14.

Orphanoudakis et al., "I2Cnet: Content-based similarity search in geographically distributed repositories of medical images," Image and Graphics, Citeseer, 1996 (pp. 1-23).

Provisional Application, U.S. Appl. No. 60/022,436, filed Aug. 6, 1996.

Hjelsvold et al., "Modelling and Querying Video Data," Proc. Of the 20th VLDB Conference, Santiago, Chile, 1994 (pp. 686-694).

Smith et al., "An image and video search engine for the world-wide web"—Proceedings of SPIE, vol. 3022, Feb. 13, 1997 (pp. 84-95).

Smith et al., "Searching for images and videos on the world-wide web," CU/CTR Technical Report #459-96-25 Columbia University, 1996, Accessed at http://www.ee.columbia.edu/dvmm/publications/96/smith96e.pdf on Feb. 17, 2011.

von Mayrhauser, "Identification of dynamic comprehension processes during large scale maintenance", IEEE Transactions on Software Engineering, 22(6):424-437 (1996).

Yang et al., "Automatic Indexing of News Video for the Content-based Retrieval," SPIE vol. 3422, pp. 176-186, From SPIE Conference on Input/Output and Imaging Technologies, Taipei, Taiwan, Jul. 1998.

Yura et al.; "Design and Implementation of the browser for the Multimedia Multi-User Dungeon of the Digital Museum", Computer Human Interaction, 1998 Proceedings, 3rd Asia Pacific, Jul. 15-17, 1998, pp. 1-6 or 44-49.

U.S. Appl. No. 09/330,860, filed Jun. 11, 1999, Ellis.

U.S. Appl. No. 09/332,244, filed Jun. 11, 1999, Ellis.

Harrison, Leon, "A review of multimedia technology and dissemination systems," *Electronic Publishing*, 7:3, 117-146 (Sep. 1994).

Orphanoudakis et al., "I²Cnet: Content-based similarity search in geographically distributed repositories of medical images," Image and Graphics, Citeseer (pp. 1-23) (1996).

Tzi-cker Chiueh—"Content-based Image Indexing"—Proc. Of the 20th International Conference on Very Large Database 1994 (pp. 582-593).

(56) References Cited

OTHER PUBLICATIONS

Yang et al., "Automatic Indexing of News Video for the Content-based Retrieval," SPIE vol. 3422, pp. 176-186. From SPIE Conference on Input/Output and Imaging Technologies, Taipei, Taiwan, Jul. 1998.
Harmandas V. et al., Association for computing machinery: "Image Retrieval by hypertext links" Proceedings of the 20th Annual International ACM-SIGIR Conference on Research and Development in Information Retrieval Philadelphia, PA, Jul. 27-31, 1997, Annual International ACM-SIGIR Conference on Research and Development in Information retrieve, Jul. 27, 1997, pp. 296-303, XP000782013 ISBN: 0-89791-836-3 abstract p. 297, right-hand column, line 15-line 40 p. 298, left-hand column, line 4-line 26.
International Business Machines Corporation: "Use of close captioning for indexing and retrieval of video" Research Disclosure, Mason Publications, Hampshire, GB, vol. 413, No. 125, Sep. 1998, XP007123340 ISSN: 0347-4353.
Apers et al.—"Content-based retrieval in Multimedia databases based on feature models"—Advanced Multimedia Content, Springer Berlin/Heidelberg vol. 1554/1999 Jan. 1, 1999 (pp. 119-130).
Bryhni et al., "On-demand Regional Television over the Internet." ACM Multimedia '96 Boston MA USA 1996 ACM (pp. 99-107).
Rune Hjelsvold and Roger Midtstraum. "Modelling and Querying Video Data." Proc. Of the 20th VLDB Conference, Santiago, Chile, 1994 (pp. 686-694).
John R. Smith, Shih-Fu Chang, "An Image and Video Search Engine for the World-Wide Web." Storage and Retrieval for Image and Video Databases 5. SPIE, US, vol. 3022, pp. 84-95 (Feb. 13, 1997).
Yura et al., "Design and Implementation of the browser for the Multimedia Multi-User Dungeon of the Digital Museum." Computer Human Interaction. 1998 Proceedings, 3rd Asia Pacific Jul. 15-17, 1998 pp. 1-6 or 44-49).
Abbott et al. "Video Formats and Resolution," Nuclear Plan Journal, 1994 (pp. 1-11).
Maltins, "Movie and Video Guide-for Palm Powered Handhelds." New York, Net Boo, 1992, Landware.com (pp. 1-14).
Smith et al., "Visually Searching the Web for Content", Columbia University; IEEE; Jul.-Sep. 1997 (pp. 12-20).
"Addressable Converters: A New Development at CableData," Via Cable, vol. 1, No. 12 (Dec. 1981) (11 pages).
"Digital Video Broadcasting (DVB): DVB specification for data broadcasting", European Telecommunications Standards Institute, Draft EN 301 192 V1.2.1 (Jan. 1999) (33 pages).
"Electronic Programme Guide (EPG); Protocol for a TV Guide using electronic data transmission" by European Telecommunciations Standards Institute, May 1997, Valbonne, France, publication No. ETS 300 707 (89 pages).
"Don Imus: The Thinking Man's Shock Jock", Broadcasting Cable, Jun. 13, 1994, pp. 49-52.
Realplayer 8 Plus User Manual, Rev. 1, Real Networks, Inc. p. 32 (2000).
"TV Listing Star on the Computer", Central Penn Business Journal/HighBeam Research, pp. 1-4, Mar. 15, 1996.
Snoeren et al., "An End-to-End Approach to Host Mobility" 6th ACM-IEEE International Conference on Mobile Computing and Networking (MOBICOM 2000), Boston, MA, USA, Aug. 2000, pp. 1-12.
Abarca et al., Telecommunications Information Networking Architecture Consortium, Service Architecture, Version 5.0, Jun. 16, 1997, 168 pages.
Arango et al., "The Touring Machine System," Communications of the ACM, Jan. 1993, vol. 36, No. 1, pp. 68-77.
Article: "Windows 98 Feature Combines TV, Terminal and the Internet", New York Times, Aug. 18, 1998.
Bestler, C. et al., "Flexible Data Structures and Interface Rituals for Rapid Development of OSD Applications", published NCTA Technical Papers, pp. 223-236, 1993.
BrugLiera, V. "Digital on Screen Display a New Technology for the Consumer Interface," Symposium Record Cable Sessions, 18th International Television Symposium and Technical Exhibition, Montreux, Switzerland, Jun. 10-15, 1993, pp. 571-586 (Jun. 11, 1993).
Cable Data: Via Cable, vol. 1, No. 12, Addressable Converters: A New Development at CableData, 11 pages, Dec. 1981.
CableData brochure, "A New Approach to Addressability" (undated).
Chang, Y., et al., "An Open Systems Approach to Video on Demand," IEEE Communications Magazine, vol. 32, No. 5 pp. 68 80 (May 1994).
Chawathe, Y., et al., "A Proxy Architecture for Reliable Multicast in Heterogeneous Environments", ACM Multimedia '98, Bristol, UK, pp. 151-159, 1998.
Davic 1.3.1 Specification Part 1, Published in 1998 by Digital Audio-Visual Counsel, 85 pages.
David M. Rudnick, U.S. Appl. No. 09/283,681, filed Apr. 1, 1999, entitled Interactive Television Program Guide Systems Having Graphic Arrangements of Program Event Regions (35 pages).
Davis, B., "Violence on Television", TV Guide on Screen to the US House of Representatives Committee of Energy and Commerce Subcommittee on Telecommunications and Finance, pp. 93-163, Jun. 25, 1993.
December, J., "Understanding the Potential of Java and the Web", Presenting Java, published Sep. 20, 1995.
Dias, D. "A Scalable and Highly Available Web Server", IEEE, Proceedings of COMPCON '96, p. 85-92, 1996.
Dimitrova, et al. "Personalizing Video Recorders in Multimedia Processing and Integration." ACM 2001 (4 pages).
F. Teraoka et al., "Host Migration Transparency in IP networks: The VIP Approach" ACM SIGCOMM-Computer Communication Review, ACM Press, New York, NY, USA, Jan. 1993, pp. 45-65.
Federighi, C. et al. "A Distributed Hierarchical Storage Manager for a Video-on-Demand System", Storage and Retrieval for Image and Video Databases II, IS&T/SPIE, Symp. on Elec. Imaging Sci. & Tech., San Jose, CA, pp. 1-13, Feb. 1994.
Fortino et al. A Cooperative Playback System for On-Demand Multimedia Sessions over Internet, 2000 IEEE, pp. 41-44.
Fox, A., "Adapting to Network and Client Variation Using Infrastructural Proxies: Lessons and Perspectives", IEEE Personal Communications, pp. 10-19, Aug. 1998.
Gondow, S., et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
Haas et al., Proceedings of ICIP 2002 Personalized News Through Conent Augmentation and Profiling:, Rochester, NY, Sep. 2002 (4 pages).
Han et al., "Dynamic Adaptation in an Image Transcoding Proxy for Mobile Web Browsing," IEEE Personal Communications, Dec. 1998, pp. 8-17.
Hofmann, et al., "Videotext Programmiert Videorecorder," Rundfunktechnische Mitteilungen, Nov. ?Dec. 1982, pp. 254-257 (translation abstract attached).
Hong, C.S. et al., "A Networking Architecture for Mobility Services Using Mobile Agent Approach, Proceedings of the TINA '97—Global Convergence of Telecommunications and Distributed Object Computing", IEEE, 1997, 11 pages.
IBM Corporation "IBM Content Manager VideoCharger, New dimensions for enterprise content, DB2 Data Management Software" pp. 1-4, Mar. 2002.
IBM Corporation "IBM Content Manager VideoCharger, Version 8, New dimensions for enterprise content, DB2 Data Management Software, pp. 1-4" May 2002, Visit IBM Web site at ibm.com/software/data/videocharger.
IBM Corporation, "IBM Video Charger Server", pp. 1-2, Jun. 1998.
ITC Investigation of Certain Products Containing Interactive Program Guide and Parental Control Technology, Investigation No. 337-TA-845, "Commission Opinion" Dec. 11, 2013 (27 pages).
ITC Investigation of Certain Products Containing Interactive Program Guide and Parental Control Technology, Investigation No. 337-TA-845, Complainants' Initial Submission in Response to Commissions's Determination to Review the Final Initial Determination Aug. 23, 2013 (55 pages).

(56) References Cited

OTHER PUBLICATIONS

ITC Investigation of Certain Products Containing Interactive Program Guide and Parental Control Technology, Investigation No. 337-TA-845, "Complainants' Reply Submission in Response to Commission's Determination to Review the Final Initial Determination" Aug. 30, 2013 (32 pages).
ITC Investigation of Certain Products Containing Interactive Program Guide and Parental Control Technology, Investigation No. 337-TA-845, "Notice of Commission Determination to Review in its entirety a Final Initial Determination Finding No Violation of Section 337" Aug. 9 2013 (6 pages).
ITC Investigation of Certain Products Containing Interactive Program Guide and Parental Control Technology, Investigation No. 337-TA-845, "Notice of the Commision's Final Determination Finding No Violation of Section 227; Termination of the Investigation" Nov. 1, 2013 (4 pages).
ITC Investigation of Certain Products Containing Interactive Program Guide and Parental Control Technology, Investigation No. 337-TA-845, "Respondent Netflix Response to Complaintants' Petition for Review" Jul. 12, 2013 (64 pages).
ITC Investigation of Certain Products Containing Interactive Program Guide and Parental Control Technology, Investigation No. 337-TA-845, "Respondent Netflix, Inc.'s Summary of Issues for Its Response to Complainants Petition for Review" Jul. 12, 2013 (6 pages).
ITC Investigation of Certain Products Containing Interactive Program Guide and Parental Control Technology, Investigation No. 337-TA-845, "Respondents Netflix, Inc.'s and Roku, Inc.'s Response to Complainants' Initial Submission in Response to Commission's Deteirmination to Review the Final Initial Determination" Aug. 30, 2013 (43 pages).
ITC Investigation of Certain Products Containing Interactive Program Guide and Parental Control Technology, Investigation No. 337-TA-845, "Respondents' Response to the Commission's Determination to Review the Final Initial Determination" Aug. 26, 2013 (62 pages).
Jaidev, "XSLT—A Wired and Wireless Case Study,"http://csharpcomputing.com/XMLTutorial/Lesson15.htm; Oct. 14, 2005 (6 pages).
Knutsson, B. et al., "Transparent Proxy Signalling", Journal of Communications and Networks, vol. 3, No. 2, pp. 164-174, Jun. 2001.
Limongiello, A. et al., "An Experimental Open Architecture to Support Multimedia Services based on CORBA, Java and WWW Technologies", Intelligence in Services and Networks: Technology for Cooperative Competition, Fourth International Conference on Intelligence in Services and Networks, IS&N'97, May 27-29, 1997, pp. 69-75.
Mah et al., "Providing Network Video Service to Mobile Clients," 1993 IEEE, pp. 48-54.
Miller, M. D. "A Scenario for the Deployment of Interactive Multimedia Cable Television Systems in the United States in the 1990's," Proceedings of the IEEE, vol. 82, No. 4, pp. 585-589 (Apr. 1994).
Papers Delivered (Part 1), 61st National Conference, Information Processing Society of Japan, Oct. 3-5, 2000 (193 pages).
Pham et al., "Exploiting Location-Based Composite Devices to Support and Facilitate Situated Ubiquitous Computing," HUC 2000, LNCS 1927, pp. 143-156.
Pogue, D., "State of the Art: For TiVo and Replay, New Reach," N.Y. Times, May 29, 2003.
Randerson, J., "Let Software Catch the Game for You," New Scientist, Jul. 3, 2004.
Rewind, replay and unwind with new high-tech TV Devices by Lawrence J. Magid, LA Times (This document was printed from the internet on Jun. 6, 1999 and bears a date of May 19, 1999).
Rowe, L., et al., "A Continuous Media Player", Proc. 3rd Int. Workshop on Network and OS Support for Digital Audio and Video, San Diego, CA, 11 pages, Nov. 1992.
S. Draper et al., TV Anytime, Proceedings International Broadcasting Convention, 1999, pp. 103-108.
Schroeder, T. et al., "Scalable Web Server Clustering Technologies", University of Nebraska—Lincoln CSE Journal Articles, Department of Computer Science and Engineering, pp. 38-45, Jun. 1, 2000.
Sorce, J. et al., "Designing a Broadband Residential Entertainment Service: A Case Study," 13th International Symposium Human Factors in Telecommunications, Torino, Italy, Sep. 10-14, 1990 pp. 141-148.
The New York Times Website Article, "2 Makers Plan Introductions of Digital VCR", by John Markoff, Mar. 29, 1999.
Thesis of Bo Zou "Mobile IDS Protocol: A badge-activated application level handoff of a multimedia streaming to support user mobility" (Aug. 2000) available at the website of the Multimedia Operating System and Networking Group of the University of Illinois (52 pages).
Uniden UST-4800 Integrated Receiver/Descrambler, Installation Guide, Installation Device, copyright 1990, Uniden America Corporation, 60 pages.
Uniden UST-4800 Integrated Receiver/Descrambler, Operating Guide, copyright 1990, Uniden America Corporation, 24 pages.
Uniden UST-4800 Super Integrated Receiver/Descrambler, Preliminary Reference Manual, 80 pages, Nov. 12, 1991.
United Kingdom: BSKyB to launch integrated personal TV recorder, BBC Monitoring Media, Sep. 11, 2000 (3 pages).
Verma, D., "Content Distribution Networks—An Engineering Approach", pp. 24-49, 2002.
Wedlund, E. et al. "Mobility Support using SIP", ACM/IEEE International Conference on Wireless and Mobile Multimedia, pp. 76-82, Aug. 20, 1999.
Introducing VideoShare.com; Consumers and Small Businesses Can Now Create and Add Video to All Web-Based Communications. Business Wire, Mar. 8, 2000. Complete Text, (Abstract). Gale Group PROMT [online]. USA. [Recovered on Mar. 23, 2015]. Recovered from: Proust LLC.
Li, et al., "Distributed Multimedia Systems," Proceedings of the IEEE, vol. 85, No. 7, pp. 1063-1108 (Jul. 1997).
Mobile Agent Approach, Global Convergence of Telecommunications and Distributed Object Computing, pp. 297-307 (1997), Section 8.4: X48494697_1.
Rainer Lienhart—"Automatic text recognition for video indexing"—Proc. Of the Fourth ACM International Conference on Multimedia, ACM 1996 (pp. 11-20).
U.S. Appl. No. 60/022,436, filed Aug. 6, 1996 (92 pages).

\* cited by examiner

SEARCH ENGINE FOR VIDEO AND GRAPHICS

REFERENCE TO RELATED APPLICATIONS

This application is a continuation of U.S. patent application Ser. No. 11/021,478 filed Dec. 22, 2004, which is a continuation of U.S. patent application Ser. No. 09/452,287 filed Nov. 30, 1999, which claims priority to U.S. Provisional Application No. 60/110,299, all three of which are hereby incorporated by reference in their entireties.

FIELD OF THE INVENTION

This invention relates generally to Internet search engines, and more particularly to a search engine for retrieval of video and graphics over the Internet.

BACKGROUND OF THE INVENTION

Over the past few years, the amount of content available over the Internet has grown tremendously. Much of the Internet's content is distributed widely across many locations. Therefore, a search engine and/or navigator is required for meaningful retrieval of information. There are numerous search engines and navigators available to search for specific content on the Internet.

Current search engines and navigators are designed to search for text within the text contained in web pages or other files on the Internet or a written description of the web page to be located. A search engine stores the location of a given piece of information and various descriptions of the information in a database that is searchable by a user. Often, the information to be located is itself descriptive.

A search engine may rely upon the content providers to establish both the location of the content and descriptive search terms to enable users of the search engine to find the content. Alternatively, the process of search engine registration is automated. A content provider places a "meta-tag" into their web page or other content. The "meta-tag" contains keywords that a search engine can index the page location upon to enable searching. The "meta-tag" is not displayed by a page reader's web browser software.

A search engine may use a web crawler to search for content on the Internet. The web crawler automatically "spiders" through web pages by following every link from one web page to other web pages until all of the links are exhausted. As the web crawler spiders through pages, the web crawler correlates the descriptive tags on each page viewed with the location of the page to construct a searchable database.

Recently, advances in Internet access have enabled more users to create video and graphic content and to distribute that content over the Internet. Furthermore, video streams are becoming more and more common as a form of content on the Internet. As with text and file content, the increasingly large amount of video and graphic content is distributed widely across many locations, thus creating the need for a search engine and/or navigator for meaningful retrieval of information.

The need to be able to search for video or graphics will only continue to grow as streaming video becomes more available and popular over the Internet or similar information transferal systems, such as on-line services, Intranets, etc. Furthermore, as personal computers and other office or home equipment develop larger and larger memory and storage capacity, the storage of video streams will become even more common and the need for a video search engine ("VSE") will increase.

Video and graphic content does not lend itself to easy searching because video and graphics often do not contain any text description that can be searched with a currently available navigator or search engine. Furthermore, there is no uniform format for identifying and describing a video or a graphic. Therefore, currently available search engines and browsers are inefficient and unusable for meaningful retrieval of video and graphic information over the Internet. There is currently no easy or direct way to search for a video or to search, display, select, or take action on, video streams. As the usage of video streams becomes even more common, there is a need for a centralized navigator and search engine for video streams.

One object of the present invention is to provide a search engine for graphics and video.

SUMMARY OF THE INVENTION

The present invention provides a method of searching for graphic or video files having corresponding locators used to locate such graphic or video files using a computer. The method comprises creating an identifier of searchable file information from identifier information related to a graphic or video file and storing the identifier and the locator for the graphic or video file in a database. The method further comprises receiving search criteria, and searching the identifiers in the database in order to select content matching the request of the user. The results of the search are sent or displayed for the user. In another embodiment of the present invention, video and graphic content is provided to a user based on user submitted criteria.

In a preferred embodiment of the present invention, identifiers are created by searching an area within a web page near a graphic or video file and by searching an area within web pages near links to a graphic or video file for searchable identification terms.

The present invention provides a system for searching for graphic or video files having corresponding locators used to locate such graphic or video files. The system comprises a means for creating an identifier containing searchable file information from identifier information related to a graphic or video file. The system further comprises a database for storing an identifier, as well as an input for receiving search criterion from a user. The system uses a search engine to search the identifiers in the database. The system sends or displays the results of the search for the user.

These and other aspects of the present invention are more readily understood when considered in conjunction with the accompanying drawings and the following detailed description.

DETAILED DESCRIPTION

Figure 1:
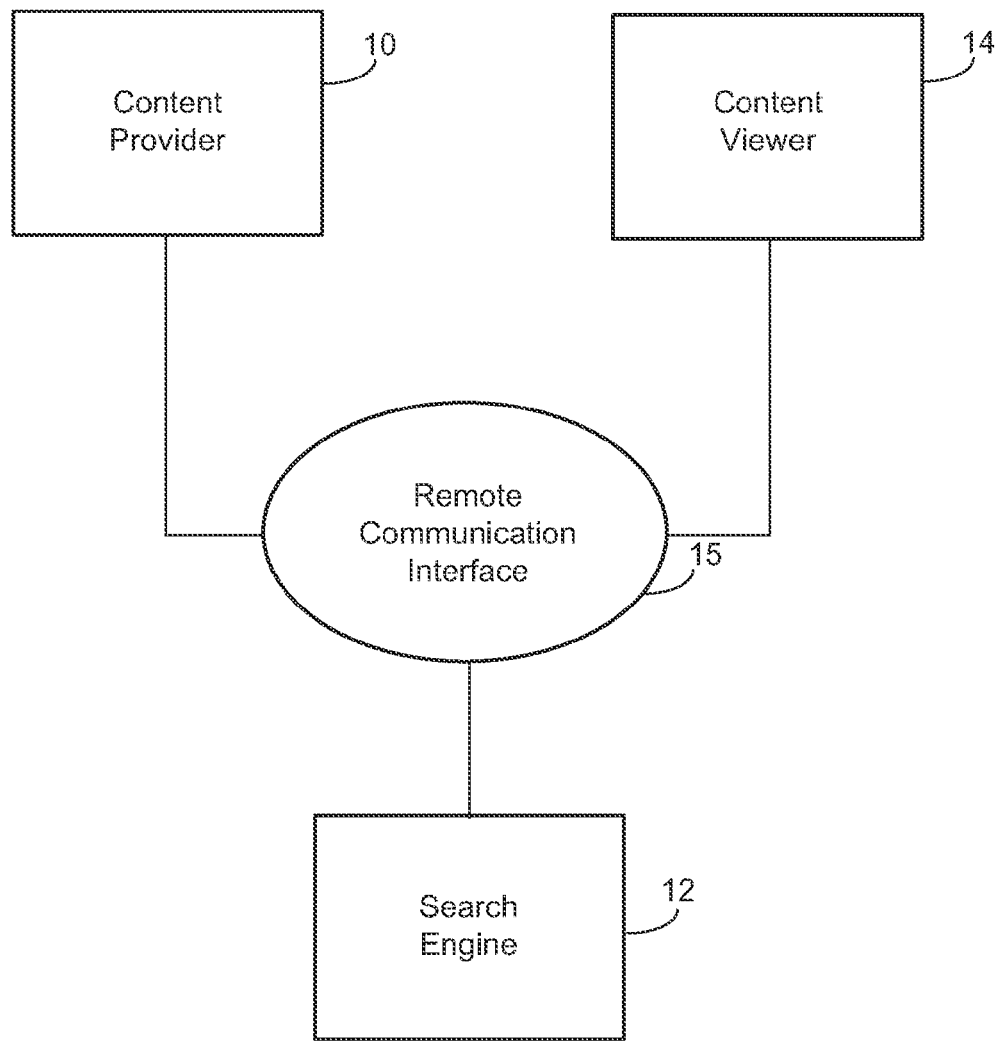
FIG. 1 is a block diagram of a system utilizing a video search engine in accordance with one embodiment of the present invention.

An overview of a video search engine ("VSE") in accordance with the present invention is illustrated in FIG. 1. The system of FIG. 1 comprises a content provider 10, a search engine 12, and a content viewer 14. The content provider, the search engine, and the content viewer, are coupled to each other via a remote communication interface 15. In the embodiment described, the remote communication interface comprises the Internet, although in alternative embodiments the remote communication interface comprises an Intranet, or other computer to computer interface. In the embodiment described, the content site, the search site, and the viewer site all comprise computers. In alternative embodiments, the content site, the search site, and/or the viewer site comprise set-top boxes. In another embodiment, one site may contain more than one of the viewer site, content site, and search site, such as one site containing both the viewer site and the search engine.

Figure 2:
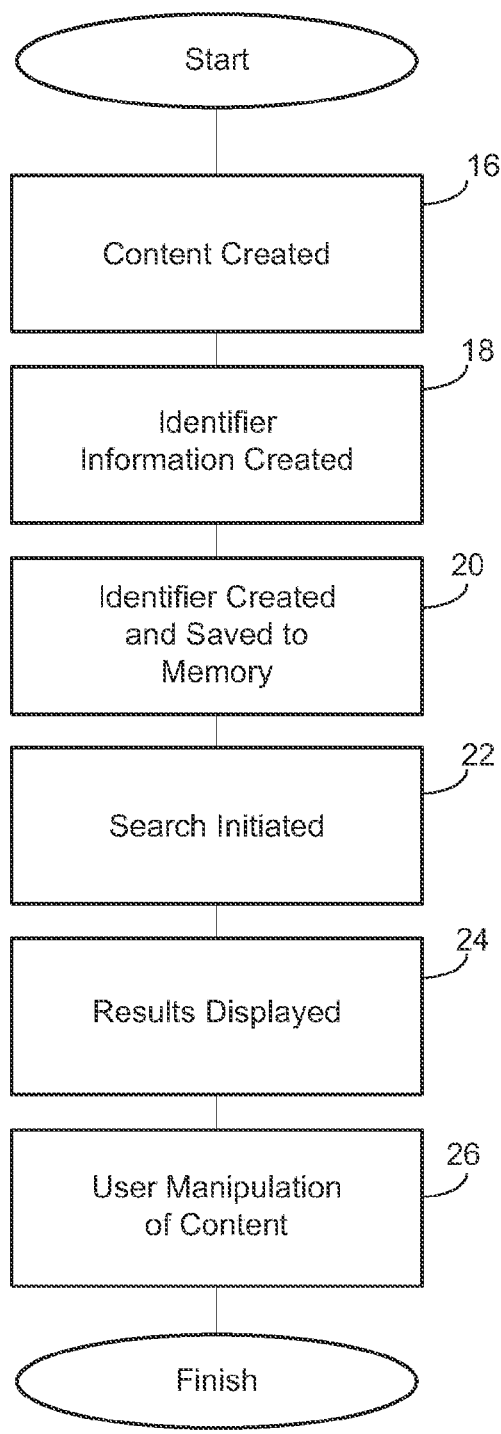
FIG. 2 is a flow diagram of a process of content development, identifier creation, and search.

An overview of a process in accordance with one embodiment of the present invention is shown in FIG. 2. The graphic or video content is created 16. Identifier information is inserted into the graphic or video file, or the area surrounding a graphic or video file link 18. The process receives searchable identifier information including the location of the file and creates an identifier entry in a storage device 20. The process receives a request for video or graphic content from a user 22. The process conducts a search for video or graphic content and displays the results to the user 24. The process provides numerous services on the selected video and graphic files to the user 26.

Graphic or video content is created using specialized software and hardware, as well as other equipment such as a camera. For example, a graphic may be created by scanning a picture with a scanner, or by creating a freehand drawing in a drawing program. A video may be created for example by using a digital video camera, or by digitizing analog video using a video capture board in a computer. As used herein the term video includes animation.

In an embodiment of the present invention, the process for searching and manipulating video and graphic content over the Internet comprises a system of identifiers. An identifier is created for each graphic or video file from pieces of information herein called identifier information. As shown in the examples below, an identifier for a video file comprises one or more of the following: a text string or other searchable attribute of a whole, segment, frame, or sub element of a video. The identifiers are used to consistently identify a whole, segment, frame, or sub element of a video respectively. An identifier for a graphic file comprises a text string or other searchable attribute of the graphic file.

Examples of identifiers are shown below. Example 1 is a whole video identifier. Example 2 is a video segment identifier. Example 3 is a video frame identifier.

EXAMPLE 1

A whole video identifier comprises one or more of the following:
Format of video stream
Size of video stream
Play time of video stream (including number of frames)
Whether or not sound is contained
Date of creation
Category of video stream
Whether it requires conditional access or payment
Text description of the video stream (This may also be broken down into additional fields including: content, author, director, year made, category, actor/actresses, owner, star rating, and parental control code.)
Representative frame of the video stream
Representative audio stream
Number of identified segments in the video stream
Number of identified frames in the video stream
A unique ID
Linking and other association information

EXAMPLE 2

A video segment identifier comprises one or more of the following:
Unique ID of the video stream to which it is a segment
Segment sequence information (from frame x to frame y) which allows unique identification of the frame when used with the unique ID of the video stream
Category of video segment
Whether it requires conditional access or payment
Text description of the video segment (This may also be broken down into additional fields including: content, author or director, year made, category, actor/actresses, owner, star rating, and parental control code.)
Representative frame of the video segment
Representative audio stream
Number of identified segments in the video segment
Number of identified frames in the video segment
Linking and other association information

EXAMPLE 3

A video frame identifier comprises one or more of the following:
Unique ID of the video stream in which it is a frame
Frame sequence information which allows unique identification of the frame when used with the unique ID of the video stream
Category of video frame
Whether it requires conditional access or payment
Text description of the video frame (This may also be broken down into additional fields including: content, author or director, year made, category, actor/actresses, owner, star rating, parental control code.)
Linking and other association information In a preferred embodiment, the textual elements of the identifier are standardized to facilitate creation, searching and archiving. In additional embodiments, one or more of the textual elements of the identifier is in coded, compressed, or encrypted form. Additionally, the textual elements in coded form utilize static and/or dynamic dictionaries.

In an embodiment of the present invention, the process for integrating identifier information into a video or graphic file is a part of the creation of the graphic or video file. The process is resident in the software or hardware used to create the content, and integrates identifier information into the graphic or video automatically as the video or graphic is saved to a storage device, such as a hard disk, optical disk, floppy disk or similar device.

In an alternative embodiment of the present invention, a process for integrating identifier information into a video or graphic file is performed after the creation of the graphic or video. Already created graphic or video files are submitted to a process server along with desired identifier information and the files are modified with identifier information. The modified file is saved to a storage device, such as a hard disk, optical disk, floppy disk or similar device.

The process provides a means of attaching identifier information to a video in a manner that does not interfere with the viewing clarity of the video. In an embodiment of the present invention, the process integrates textual identifier information into the filename of the video stream or graphic file. In an alternative embodiment of the present invention, the identifier information is located in a part of the file that is not displayed by viewer software, such as at the beginning or the end of the file.

Figure 3:
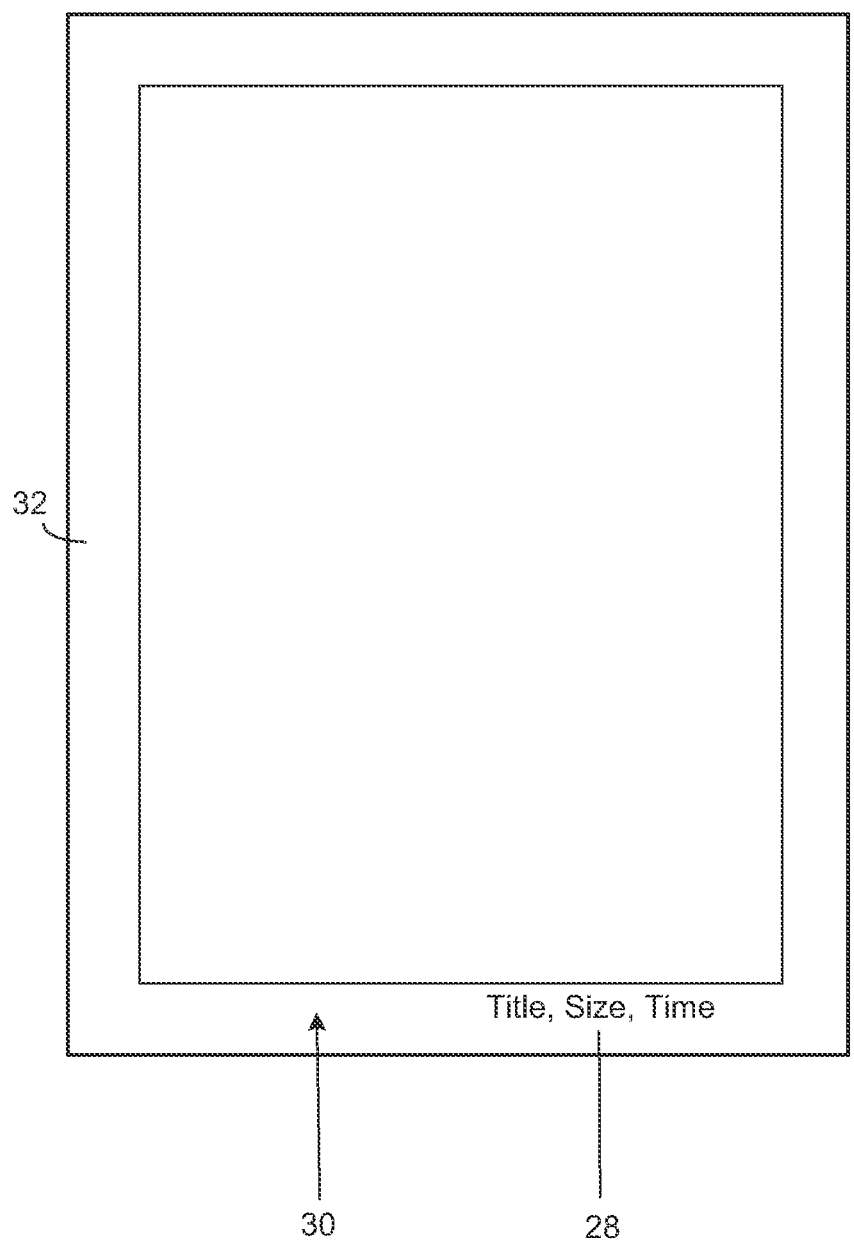
FIG. 3 illustrates a video frame with embedded identifier information in accordance with the present invention.

In a preferred embodiment of the present invention, as shown in FIG. 3, the textual identifier information 28 is embedded in each frame of a video, so that the video is identifiable to the accuracy of a frame. In a more preferred embodiment of the present invention the textual identifier information 28 is placed on the outside periphery of each frame of the video 30. In a particularly preferred embodiment of the present invention, the placing of the identifier information is hidden by displaying the video stream within a graphically created frame 32 that overlaps the periphery of the video so as to obscure the identifier information placed in the periphery of the video. In another embodiment of the present invention a graphic file has textual identifier information placed on its periphery as done with a video stream above.

In another embodiment of the present invention, the video content comprises a stream of packets containing the elements of the video. Each packet contains informational headers indicating the content contained in the packet. Identifier information is placed into informational packets that are located within a video stream. These informational packets contain headers identifying them as non-video packets. The information packets are not displayed by the video viewer, but are used by the identifier creation process to acquire identifier information for each whole, segment, or frame of the video.

In an embodiment of the present invention, the content comprises graphic or video files wherein the identifier information is not located inside of the file itself. To acquire identifier information, the process searches the content surrounding the graphic or video on the content provider's computer. The process also searches the content of a web page surrounding links to the graphic or video, or receives identifier information directly from the content provider. Alternatively, the identifier information is placed in a file accompanying the graphic or video file.

In an embodiment of the present invention, the process generates identifiers to be searched by automatically locating video streams or graphics on the web, reading any associated text surrounding any links to the video stream or graphic, and using the text to create an identifier or identifiers for a video or graphic file. The process also searches through web sites that contain video streams or graphics, and using pointers in such web sites that open or click to the video stream or graphic or web page containing the video stream or graphic, and "reverse locates" any text description of the video stream. Additionally, a database of links contained in a large number of other web sites from throughout the world wide web, such as a typical database created by a web spider or web crawler, is searched for other web pages with links to the video or graphics file. After generating an identifier, the process stores the identifier in a database. In a preferred embodiment of the present invention, the database is stored in a storage device, such as a hard disk, optical disk, floppy disk or similar device.

For example, when a link is used to open a video stream, the process automatically searches to find all of the web pages where the link is contained, whether from the same web site as the video or graphic file or other web site. Once a link to the graphic or video is found, the process searches in the "neighborhood" around the link to acquire relevant text information. The text in the "neighborhood" or area around the link is likely to contain descriptive and informational terms of interest. The closer to the link, the more likely the text is to contain relevant information. Text within the same paragraph, column, or general page area as the link, is likely to contain some information that can be placed into a searchable identifier. When more than one web page is found that contains links to the video or graphic, a comparison is performed on the "neighborhood" text from the various web pages and terms or phrases that appear on more than one web page. Such terms in common are given more weight in the identifier for the video stream. Further, the more of these web pages that include the same terms, the more weight is given to these terms in the identifier.

In a preferred embodiment of the present invention, text parsing techniques are used to identify relevant lines of text to incorporate into the textual description and other textual fields such as a date of creation, size, or category of the video in the identifier. Alternatively, keywords are used to locate and incorporate relevant information into the textual description and other textual fields in the identifier.

In an additional embodiment of the present invention, the process solicits a user to submit information regarding a graphic or video file and then generates one or more tags to be inserted into the area surrounding the link to the graphic or video file. Currently, meta-tags exist for describing a page of content, but additional specialized tags may be created to contain identifier information for other specific types of content. Once the tags are inserted into the area surrounding the link, the automatic identifier creation process creates a searchable link to the video or graphic.

In an additional embodiment of the present invention, the process solicits a user to submit information regarding a graphic or video file. Using the user provided information along with the location of the file, the process generates an identifier, and saves the identifier in a database. Alternatively, the process solicits a user to submit information regarding a graphic or video file and then generates a file that contains identifier information about the graphic or video file to accompany the graphic or video file.

An embodiment of the present invention allows a user to search through identifiers to locate one or more graphics or videos. The process locates and retrieves video and graphic files by searching through the identifiers in a database for desired attributes and uses the location information in the identifier to acquire the file.

Figure 4:
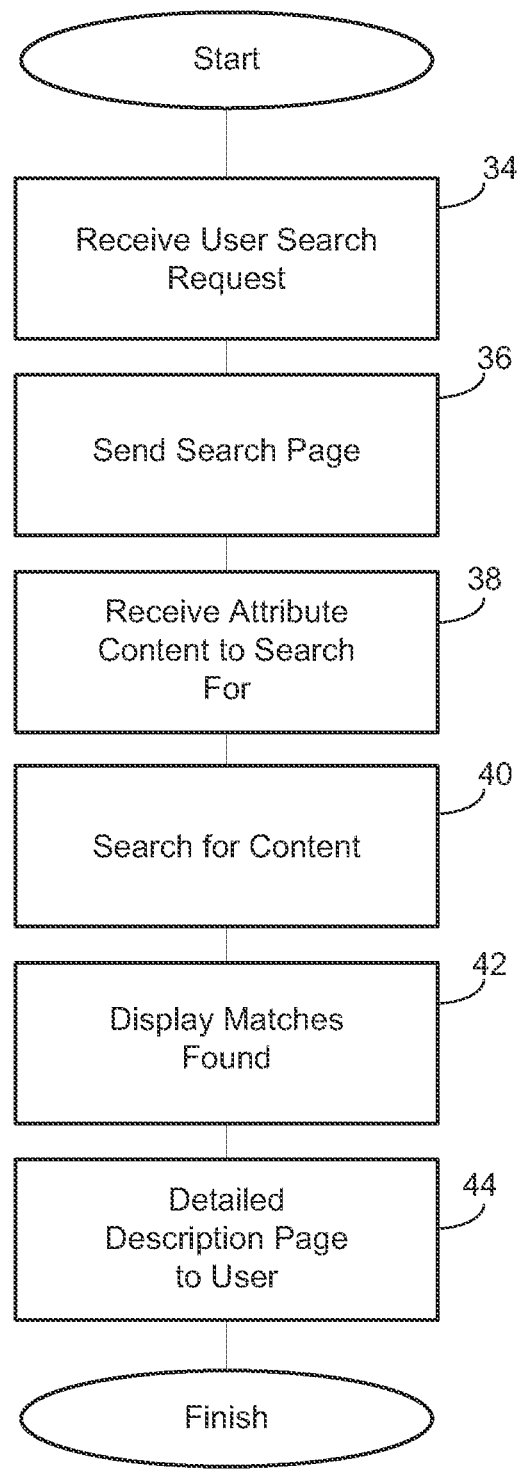
FIG. 4 is a flow diagram of a search process of the present invention.

In a preferred embodiment of the present invention, as shown in FIG. 4, in response to a user request 34, the process generates a search screen 36 containing several fields, each for a different searchable attribute, prompting the user to specify the content of each attribute that they would like to search by. The process receives the user's search criteria 38 and then conducts a search of the various file identifiers in a storage device 40. The process generates a results page 42 listing matches to the user's search criteria. The results page comprises hotlinks to the graphic or video files, as well as descriptions and other attributes of the files.

In another embodiment of the present invention, the results page provides a link to a detailed information page 44. The process caches a portion of a video, or an attribute of the video, such as an audio segment, or at least one video frame or sub-frame, to enable a user to further identify content. Additionally, the process aggregates the identifiers for display to users on the detailed information page.

In a preferred embodiment of the present invention, the process assembles a "video guide" that comprises: a text description of a video, a URL or other location indicator for locating a whole, segment, or frame of a video, an audio sample from the video, and "teaser" frames or segments of a video to assist in the identification or promotion of a video. In an embodiment of the present invention, the "video guide" is resident on a central server, in a local unit, or a combination of both.

In a more preferred embodiment of the present invention, the "video guide" enables a user to locate, display, download, and record a selected whole, segment, frame, or sub-component of a video. Moreover, the "video guide" allows a user to conduct all of the above operations, as well as finding, selecting, grouping, erasing, concatenating, segmenting, and integrating a class of videos. In a preferred embodiment of the present invention, the "video guide" is a software, firmware, or hardware feature resident in a personal computer or similar device capable of storing video streams.

In an additional embodiment of the present invention, the process integrates video or graphic information with a conditional access system or a payment system. The identifier for the video or graphic contains a field indicating whether there is a conditional access or payment system. If there is a conditional access or payment system, then the identifier contains information about the access site or payment system and/or a link to the access site or payment system. In a preferred embodiment of the present invention, the process solicits the user for the authorization information or payment, and only upon proper authorization allows the user to access the video or graphic.

In an additional embodiment of the present invention, the process integrates video stream information with television programs that are receivable on the same device enabling the video or graphic search. If there is a link to a television show, the identifier contains a link to that televisions show and conveys that information to a user. Additionally, the process enables the user to search for video streams and graphics using television links as a searchable attribute.

In an additional embodiment of the present invention, the process integrates video stream information with other information, such as guides or lists of other items associated with the video stream. Items associated with the video or graphic include products, services, and web sites. Additionally, the process provides links to other information, whether or not that information is related to the video.

In an additional embodiment of the present invention, the process allows the user to customize, program, or set parameters for the usage of the process, such as smart agent filtering, a programmed search of certain types of video streams already in existence, and programmed "alert" searching for types of video streams coming into existence in the future. Additionally, the process provides a means of filtering, selecting or blocking whole video files, video segments, and video frames in accordance with user controls, such as the blocking of violence or nudity from a video.

The preceding description has been presented with reference to the presently preferred embodiments of the invention shown in the drawings. Workers skilled in the art and technology to which this invention pertains will appreciate that alteration and changes in the described processes and structures can be practiced without departing from the spirit, principles and scope of this invention.

Accordingly, the present invention provides for a video search engine. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

The invention claimed is:

1. A method of providing video information in response to text based searches comprising:
   receiving, at a server, a user submission of identifier information with a video file for storage in an electronic storage device, wherein the identifier information comprises a text description of the video file;
   storing, in the electronic storage device, the identifier information;
   generating an identifier of the video file based on the identifier information, wherein the generated identifier comprises an author and an owner of the video file;
   storing the identifier in the electronic storage device;
   receiving a user input of search criteria matching the identifier; and
   in response to receiving the user input:
      determining a location at which the video file is accessible;
      providing, in a results page, a user-selectable link to the video file based on the determined location;
      retrieving at least some of the identifier information from the electronic storage device; and
      providing, in the results page, the retrieved identifier information.

2. The method of claim 1, further comprising providing information about an item, wherein the item is at least one of a product, service, and website that is associated with the video file.

3. The method of claim 1, further comprising receiving an instruction to perform an operation with the video file, wherein the operation comprises one or more of viewing, saving, downloading, and sending.

4. The method of claim 1, wherein the results page is provided through an Internet interface.

5. A system for providing video information in response to text based searches, the system comprising control circuitry configured to:
   receive, at a server, a user submission of identifier information with a video file for storage in an electronic storage device, wherein the identifier information comprises a text description of the video file;
   store, in the electronic storage device, the identifier information;
   generate an identifier of the video file based on the identifier information, wherein the generated identifier comprises an author and an owner of the video file;
   store the identifier in the electronic storage device;
   receive, subsequent to the user submission, a user input of search criteria matching the identifier ;and
   in response to receiving the user input:
      determine a location at which the video file is accessible;
      provide, in a results page, a user-selectable link to the video file based on the determined location;
      retrieve at least some of the identifier information from the electronic storage device; and
      provide, in the results page, the retrieved identifier information.

6. The system of claim 5, wherein the control circuitry is further configured to provide information about an item, wherein the item is at least one of a product, service, and website that is associated with the video file.

7. The system of claim 5, wherein the control circuitry is further configured to receive an instruction to perform an operation with the video file, wherein the operation comprises one or more of viewing, saving, downloading, and sending.

8. The system of claim 5, wherein the results page is provided through an Internet interface.

9. A non-transitory computer readable storage medium containing program instructions for providing video information in response to text based searches, the instructions comprising:
- an instruction for receiving, at a server, a user submission of identifier information with a video file for storage in an electronic storage device, wherein the identifier information comprises a text description of the video file;
- an instruction for storing, in the electronic storage device, the identifier information;
- an instruction for generating an identifier of the video file based on the identifier information, wherein the generated identifier comprises an author and an owner of the video file;
- an instruction for storing the identifier in the electronic storage device;
- an instruction for receiving, subsequent to the user submission, a user input of search criteria matching the identifier; and
- an instruction for, in response to receiving the user input:
  - determining a location at which the video file is accessible;
  - providing, in a results page, a user-selectable link to the video file based on the determined location;
  - retrieving at least some of the identifier information from the electronic storage device; and
  - providing, in the results page, the retrieved identifier information.

10. The computer readable storage medium of claim 9, further comprising an instructions for providing information about an item, wherein the item is at least one of a product, service, and website that is associated with the video file.

11. The computer readable storage medium of claim 9, further comprising an instructions for performing an operation with the video file, wherein the operation comprises one or more of viewing, saving, downloading, and sending.

12. The computer readable storage medium of claim 9, wherein the results page is provided through an Internet interface.

13. A method for providing a web page that includes user-submitted video file information in response to text based searches, comprising:
- receiving, at a server and through an Internet interface, a user submission of information with a video file for storage in an electronic storage device;
- storing, in the electronic storage device, the user-submitted information;
- generate an identifier of the video file based on the user-submitted information, wherein the generated identifier comprises an author and an owner of the video file;
- store the identifier in the electronic storage device;
- receiving, subsequent to the user submission, a user input including a search term;
- retrieving at least a portion of the user-submitted information about the video file from the electronic storage device when the search term matches the identifier; and
- generating a web page that includes the retrieved user-submitted information, an image associated with the user-submitted video file, and a selectable link to the user-submitted video file.

14. A non-transitory computer readable storage medium containing program instructions for retrieving video files in response to text based searches, the instructions comprising:
- an instruction for receiving, at a server and through an Internet interface, a user submission of information with a video file for storage in an electronic storage device;
- an instruction for storing, in the electronic storage device, the user-submitted information;
- an instruction for generating an identifier of the video file based on the user-submitted information, wherein the generated identifier comprises an author and an owner of the video file;
- an instruction for storing the identifier in the electronic storage device;
- an instruction for matching the identifier to a search term received subsequent to the user submission;
- an instruction for retrieving at least a portion of the user-submitted information from the electronic storage device when the search term matches the user-submitted information; and
- an instruction for generating for display a web page that includes the retrieved user-submitted information, an image associated with the user-submitted video file, and a selectable link to the user-submitted video file.

\* \* \* \* \*